US009933525B2

(12) United States Patent
Singh

(10) Patent No.: US 9,933,525 B2
(45) Date of Patent: Apr. 3, 2018

(54) SYSTEMS AND METHODS FOR A TERRESTRIAL-BASED POSITIONING BEACON NETWORK

(75) Inventor: Rajendra Singh, Indian Creek Island, FL (US)

(73) Assignee: TELCOM VENTURES, LLC, Miami, FL (US)

( * ) Notice: Subject to any disclaimer, the term of this patent is extended or adjusted under 35 U.S.C. 154(b) by 1362 days.

(21) Appl. No.: 13/334,997

(22) Filed: Dec. 22, 2011

(65) Prior Publication Data
US 2012/0169541 A1    Jul. 5, 2012

Related U.S. Application Data

(60) Provisional application No. 61/428,546, filed on Dec. 30, 2010, provisional application No. 61/434,616, (Continued)

(51) Int. Cl.
*G01S 19/11* (2010.01)
*G01S 1/02* (2010.01)
(Continued)

(52) U.S. Cl.
CPC .............. *G01S 19/11* (2013.01); *G01S 1/02* (2013.01); *G01S 5/0215* (2013.01); *G01S 19/12* (2013.01); *G01S 19/21* (2013.01); *G01S 19/22* (2013.01)

(58) Field of Classification Search
CPC ......... G01S 19/11–19/12; G01S 19/21–19/22; G01S 1/02; G01S 1/042; G01S 1/045; G01S 5/0215
See application file for complete search history.

(56) References Cited

U.S. PATENT DOCUMENTS 6,031,487 A    2/2000   Mickelson
6,771,625 B1   8/2004   Beal
(Continued)

FOREIGN PATENT DOCUMENTS

CN    101682905 A      3/2010
JP     05252098 A  *   9/1993
(Continued)

OTHER PUBLICATIONS

Sideband. (1999). In Newnes Dictionary of electronics, newnes. Oxford, United Kingdom: Elsevier Science & Technology. Retrieved from http://search.credoreference.com/content/entry/bhelec/sideband/0.*
(Continued)

*Primary Examiner* — Bernarr E Gregory
*Assistant Examiner* — Fred H Mull
(74) *Attorney, Agent, or Firm* — Myers Bigel, P.A.

(57) ABSTRACT

Terrestrial-based positioning beacon networks may include first and second terrestrial-based positioning beacons that are configured to simultaneously transmit signals to a terrestrial receiver. The first terrestrial-based positioning beacon may be configured to modify its transmissions to the terrestrial receiver in response to an identification of potential interference with the transmissions from the first terrestrial-based positioning beacon or the second terrestrial-based positioning beacon to the terrestrial receiver. Related methods, beacons, and receivers are also described.

6 Claims, 30 Drawing Sheets

Related U.S. Application Data filed on Jan. 20, 2011, provisional application No. 61/471,838, filed on Apr. 5, 2011.

(51) Int. Cl.
*G01S 5/02* (2010.01)
*G01S 19/12* (2010.01)
*G01S 19/21* (2010.01)
*G01S 19/22* (2010.01)

(56) References Cited

U.S. PATENT DOCUMENTS

| | | | |
|---|---|---|---|
| 7,043,259 B1 | 5/2006 | Trott | |
| 7,505,774 B1 | 3/2009 | Trott | |
| 2002/0097191 A1* | 7/2002 | Harel | H01Q 1/246 343/890 |
| 2003/0061001 A1* | 3/2003 | Willins | G01S 5/0284 702/153 |
| 2004/0090938 A1* | 5/2004 | Hsu | 370/335 |
| 2004/0116134 A1* | 6/2004 | Maeda | H04B 7/1855 455/457 |
| 2008/0088507 A1 | 4/2008 | Smith et al. | |
| 2008/0309557 A1* | 12/2008 | Mailaender | 342/463 |
| 2010/0073229 A1* | 3/2010 | Pattabiraman et al. | 342/357.09 |
| 2010/0178929 A1 | 7/2010 | Kennedy, Jr. et al. | |
| 2010/0227612 A1* | 9/2010 | Wang | H04L 5/0048 455/434 |
| 2011/0090885 A1* | 4/2011 | Safavi | 370/338 |
| 2011/0248704 A1* | 10/2011 | Chowdhary | G01C 17/38 324/202 |
| 2012/0263109 A1* | 10/2012 | Wigard | H04W 16/08 370/328 |
| 2013/0300600 A1* | 11/2013 | Park | G01S 19/11 342/357.48 |

FOREIGN PATENT DOCUMENTS

| | | |
|---|---|---|
| JP | 2000180527 A | 6/2000 |
| JP | 2008-211667 A | 9/2008 |
| JP | 2010529419 A | 8/2010 |
| JP | 2010530176 A | 9/2010 |
| WO | WO 2008/137607 A2 | 11/2008 |
| WO | WO 2008/156579 A1 | 12/2008 |

OTHER PUBLICATIONS

Sidebands. (2001). In Hargrave's communications dictionary, wiley. Hoboken, NJ: Wiley. Retrieved from http://search.credoreference.com/content/entry/hargravecomms/sidebands/0.*
Sideband. (2009). In J. Cullerne, J. Cullerne, & J. Cullerne (Eds.), The Penguin dictionary of physics. London, United Kingdom: Penguin. Retrieved from http://search.credoreference.com/content/entry/pendphys/sideband/0.*
Single-Sideband transmission (SST). (2009). In J. Cullerne, J. Cullerne, & J. Cullerne (Eds.), The Penguin dictionary of physics. London, United Kingdom: Penguin. Retrieved from http://search.credoreference.com/content/entry/pendphys/single_sideband_transmission_sst/0.*
Smart Antenna. (1999). Focal Dictionary of Telecommunications, Focal Press, London, UK: Routledge. Retrieved from http://search.credoreference.com/content/entry/bhfidt/smart_antenna/0.*
Antenna. (2011). The American Heritage Dictionary of the English Language. Boston, MA: Houghton Mifflin. Retrieved from http://search.credoreference.com/content/entry/hmdictenglang/antenna/0.*
Antenna. (2016). The Columbia Encyclopedia. New York, NY: Columbia University Press. Retrieved from http://search.credoreference.com/content/entry/columency/antenna/0.*
Pseudolite, IEEE Std 1559-2009, IEEE Standard for Inertial Systems Terminology, accessed Dec. 7, 2016.*
J.D. Gibson (ed.), The Communications Handbook, Second Edition, CRC Press, section 77.7, 2002.*
Z. Xiang et al., A Wireless LAN Based Indoor Positioning Technology, IBM Journal of Research and Development, vol. 48(5/6), 2004.*
Transmitter. (2011). The American Heritage Dictionary of the English Language (5th ed.). Boston, MA: Houghton Mifflin. Retrieved from http://search.credoreference.com/content/entry/hmdictenglang/transmitter/0.*
International Preliminary Report on Patentability Corresponding to International Application No. PCT/US2011/066710; dated Mar. 5, 2013; 12 Pages.
International Search Report Corresponding to International Application No. PCT/US2011/066710; dated Aug. 7, 2012; 16 Pages.
Chinese Decision of Rejection Corresponding to Chinese Patent Application No. 201180067472.3; dated Sep. 1, 2014; Foreign Text, 12 Pages, English Translation Thereof, 5 Pages.
Written Opinion of the International Preliminary Examining Authority Corresponding to International Application No. PCT/US2011/066710; dated Dec. 18, 2012; 9 Pages.
Cobb, H. Stewart, (1997) *GPS Pseudolites: Theory, Design, and Applications* (Doctoral dissertation) Stanford University, California.
Stansell, Jr. ,"RTCM SC-104 Recommended Pseudolite Signal Specification", *Navigation : Journal of the Institute of Navigation*, vol. 33, No. 1, pp. 42-59, (1986).
Invitation to Pay Additional Fees Corresponding to International Application No. PCT/US2011/066710; dated May 30, 2012; 7 Pages.
Japanese Office Action Corresponding to Japanese Patent Application No. 2013-547563; dated Dec. 6, 2016; Foreign Text, 18 Pages, English Translation Thereof, 15 Pages.
Lemaster, Edward Alan, "Self-Calibrating Pseudolite Arrays: Theory and Experiment", Dissertation, May 2002, 188 pages.
Xu et al., "Low-cost GPS Pseudolite", CD-ROM Proceedings, International Symposium on GPS/GNSS 2008 in Tokyo, 2008, p. 521-525, (10 pages).

* cited by examiner

SYSTEMS AND METHODS FOR A TERRESTRIAL-BASED POSITIONING BEACON NETWORK

CLAIM OF PRIORITY

The present application claims the benefit of U.S. Provisional Patent Application Ser. Nos. 61/428,546, filed Dec. 30, 2010, entitled Systems and Methods for Mitigating Near-Far Problem in an Assisted GPS System with a Terrestrial Beacon Network; 61/434,616, filed Jan. 20, 2011, entitled Use of Smart Antennas in a Positioning System with a Terrestrial Beacon Network; and 61/471,838, filed Apr. 5, 2011, entitled Use of Multiple Signal Bandwidths in a Terrestrial Beacon Network, the disclosures of all of which are incorporated herein in their entirety by reference.

FIELD

The present invention relates to wireless communications systems and methods, and more particularly to Terrestrial-based Beacon Network (TBN) systems and methods.

BACKGROUND

Pseudolite Systems

A satellite-based Global Positioning System (GPS) can be assisted with a TBN to help with GPS location determination in areas that are difficult to cover, such as urban canyons and inside buildings. Alternatively, the TBN may be a stand-alone network of terrestrial-based beacons that may transmit and/or receive signals without using GPS satellites. The beacons in the TBN may be pseudo-satellites, or pseudolites, which may perform functions similar to GPS satellites. One example of the use of pseudolites with a GPS system is described in *Recommended Pseudolite Signal Specification* by Thomas A. Stansell, Jr. (Navigation, Vol. 33, Spring 1986). Another example is described in *GPS Pseudolites: Theory, Design, and Applications* by H. Stewart Cobb (A Dissertation Submitted to the Department of Aeronautics and Astronautics and the Committee on Graduate Studies of Stanford University in Partial Fulfillment of the Requirements for the Degree of Doctor of Philosophy, 1997). A further example is described in U.S. Pat. No. 6,031,487 to Mickelson, entitled GPS Pseudolite and Receiver System Using High Anti-jam Pseudolite Signal Structure.

Near-Far Problem

One problem with TBNs, however, is the near-far problem, which may occur when a receiver is positioned such that the signal received from one beacon is significantly stronger than the signal received from another beacon. Typically, this occurs when the receiver is positioned close to one of the beacons. Each beacon may transmit a signal that is spread using a spreading code. A strong signal from the nearby beacon can impede the receiver from receiving a weaker signal from a more distant beacon, sometimes even when the beacons transmit using different spreading codes.

Approaches to the Near-Far Problem

One approach to the near-far problem has been the use of Time Division Multiplexing (TDM). In the TDM approach, different beacons attempt to mitigate near-far problems by transmitting their signals during different time intervals. For example, each beacon may transmit only for a fraction of the available time in a given interval. The beacons can determine when to transmit either based on a pre-determined time slot assignment and/or they can transmit based on random patterns, as long as each beacon can transmit for at least some fraction of time. An example of pseudolites that broadcast signals in different time slots is described in U.S. Pat. No. 6,771,625 to Beal, entitled Pseudolite-Augmented GPS for Locating Wireless Telephones.

In addition to the TDM approach, another near-far mitigation technique is extending the dynamic range of a GPS receiver so that the receiver can more readily distinguish lower power signals. For example, although older GPS receivers had a simple design and had limited dynamic range, modern GPS receivers can have a dynamic range in excess of seventy (70) decibels (dB).

A further near-far mitigation technique involves the use of Code Division Multiple Access (CDMA) spreading codes with improved cross-correlation properties. For example, in a well-designed network of beacons, a small number of beacons that are nearby a given beacon may cause some of the most serious near-far problems. These nearby beacons can be assigned their own CDMA codes with excellent cross-correlation properties.

Multipath Problems

Another problem with TBNs is the multipath problem. For example, a signal transmitted by a beacon may be received by a receiver from one or more reflected/diffracted signal paths other than the direct signal path. The direct-path signal may be the signal that arrives the earliest in time. Indirect-path signals may be later-arriving signals that have been reflected/diffracted. These reflected/diffracted paths may be caused by nearby and/or far-away objects, and such objects may be natural and/or man-made. As a result, multipath problems may contribute to position location error in TBNs.

Signal Bandwidths

Some positioning systems may use signals in different frequency bands and/or different bandwidths. For example, GPS systems may use satellite signals in different frequency bands and at different bandwidths. Wider bandwidth signals may have bandwidths that are several times (or, in some circumstances, dozens of times) larger than the bandwidths of narrower bandwidth signals. The wider bandwidth signals may be used for higher position location accuracy. The wider bandwidth signals, however, may also require more signal processing.

Smart Antennas

One type of antenna is "smart antennas," which enable the steering/switching of antenna patterns in particular directions. Examples of transmitting signals using "smart antennas" are described in U.S. Pat. Nos. 7,043,259 and 7,505,774 to Trott, entitled Repetitive Paging from a Wireless Data Base Station Having a Smart Antenna System, and in U.S. Patent Publication No. 2010/0178929 to Kennedy, entitled Network Overlay Geo-Location System with Smart Antennas and Method of Operation.

SUMMARY

According to some embodiments herein, terrestrial-based positioning beacon networks may include first and second terrestrial-based positioning beacons that are configured to simultaneously transmit signals to a terrestrial receiver. The first terrestrial-based positioning beacon may be configured to modify its transmissions to the terrestrial receiver in response to an identification of potential interference with the transmissions from the first terrestrial-based positioning beacon or the second terrestrial-based positioning beacon to the terrestrial receiver.

In some embodiments, the potential interference may be between the transmissions from the first terrestrial-based positioning beacon and simultaneous transmissions from the second terrestrial-based positioning beacon to the terrestrial receiver.

Some embodiments provide that the first terrestrial-based positioning beacon may be configured to reduce its transmit power in response to the identification of the potential interference.

In some embodiments, each of the first and second terrestrial-based positioning beacons may be assigned a broadcast slot during which it is configured to transmit at its maximum power level.

Some embodiments provide that each of the first and second terrestrial-based positioning beacons may be configured to determine for each broadcast slot whether to transmit at its maximum power level or to reduce its transmit power.

In some embodiments, the first terrestrial-based positioning beacon may be configured to change its antenna pattern in response to the identification of the potential interference.

Some embodiments provide that the potential interference may be between the antenna pattern of the first terrestrial-based positioning beacon and an antenna pattern of the second terrestrial-based positioning beacon.

In some embodiments, the identification of the potential interference may include detecting reflection/diffraction of the transmissions from the first terrestrial-based positioning beacon to the terrestrial receiver.

Some embodiments provide that the first terrestrial-based positioning beacon may be configured to change a bandwidth of its transmissions in response to the identification of the potential interference.

In some embodiments, changing the bandwidth of the transmissions of the first terrestrial-based positioning beacon may include changing the bandwidth to a bandwidth that is different from a bandwidth of the transmissions of the second terrestrial-based positioning beacon.

Some embodiments provide that respective frequency bands of the different bandwidths may be non-overlapping.

In some embodiments, the identification of the potential interference includes determining that the transmissions from the first terrestrial-based positioning beacon are sufficiently powerful enough to interfere with the simultaneous transmissions from the second terrestrial-based positioning beacon at the terrestrial receiver. Additionally or alternatively, the identification of the potential interference may include an identification that is made during design of the terrestrial-based positioning beacon network, during field testing of the terrestrial-based positioning beacon network, and/or in real-time.

According to some embodiments, methods of reducing interference in a terrestrial-based positioning beacon network may include determining that transmissions from a first terrestrial-based positioning beacon are sufficiently powerful enough to interfere with simultaneous transmissions from a second terrestrial-based positioning beacon at a terrestrial receiver. The methods may also include modifying the transmissions from the first terrestrial-based positioning beacon to the terrestrial receiver in response to determining that the transmissions from the first terrestrial-based positioning beacon are sufficiently powerful enough to interfere with the simultaneous transmissions from the second terrestrial beacon at the terrestrial receiver.

In some embodiments, modifying the transmissions from the first terrestrial-based positioning beacon may include modifying at least one of transmit power, antenna pattern, and bandwidth for signals transmitted from the first terrestrial-based positioning beacon to the terrestrial receiver.

Some embodiments provide that the methods may further include, after modifying the transmissions from the first terrestrial-based positioning beacon by modifying at least one of the transmit power, the antenna pattern, and the bandwidth, further modifying the transmissions from the first terrestrial-based positioning beacon by modifying a different one of the transmit power, the antenna pattern, and the bandwidth.

In some embodiments, modifying the transmissions from the first terrestrial-based positioning beacon may further include increasing the bandwidth of the signals transmitted from the first terrestrial-based positioning beacon in response to determining that a high level of position location accuracy is preferred.

According to some embodiments, terrestrial-based positioning beacon networks may include a plurality of terrestrial-based positioning beacons. At least two of the plurality of terrestrial-based positioning beacons may be configured to simultaneously transmit respective signals at one or more non-trivial power levels to a terrestrial receiver during the same broadcast slot.

In some embodiments, the terrestrial-based positioning beacon networks may further include a plurality of contiguous broadcast frames, each of which includes a plurality of broadcast slots. Also, simultaneously transmitting the signals may further include simultaneously transmitting the signals at the one or more non-trivial power levels to the terrestrial receiver during at least one of the plurality of broadcast slots of each of the plurality of contiguous broadcast frames.

Some embodiments provide that each of the broadcast slots in each of the plurality of contiguous broadcast frames may include simultaneous transmissions at the one or more non-trivial power levels to the terrestrial receiver by at least two of the plurality of terrestrial-based positioning beacons.

In some embodiments, the terrestrial receiver may be configured to distinguish between the signals transmitted at the one or more non-trivial power levels to the terrestrial receiver based on different pseudo-random codes transmitted with the respective signals.

Some embodiments provide that all of the plurality of terrestrial-based positioning beacons may be configured to simultaneously transmit their respective signals at the one or more non-trivial power levels to the terrestrial receiver during the same broadcast slot.

In some embodiments, the one or more non-trivial power levels may include power levels at which the terrestrial receiver is configured to receive and process each of the respective signals.

According to some embodiments, methods of reducing interference in a terrestrial-based positioning beacon network may include receiving simultaneous unmodified transmissions from a plurality of terrestrial-based positioning beacons at one or more non-trivial power levels at a terrestrial receiver. The unmodified transmissions from at least one of the terrestrial-based positioning beacons may be sufficiently powerful enough to interfere with simultaneous unmodified transmissions from another one of the terrestrial-based positioning beacons at the terrestrial receiver. The methods may further include, after receiving the simultaneous unmodified transmissions from the plurality of terrestrial-based positioning beacons, receiving modified transmissions from the at least one terrestrial-based positioning beacon at the one or more non-trivial power levels at the terrestrial receiver while simultaneously receiving the unmodified transmissions from the another one of the terrestrial-based positioning beacons at the one or more non-trivial power levels at the terrestrial receiver.

In some embodiments, the modified transmissions may be modified in comparison with the unmodified transmissions with respect to at least one of transmit power, antenna pattern, and bandwidth.

According to some embodiments, a terrestrial-based positioning device includes a receiver that is configured to receive simultaneous unmodified transmissions from a plurality of terrestrial-based positioning beacons at one or more non-trivial power levels. Unmodified transmissions from at least one of the terrestrial-based positioning beacons may be sufficiently powerful enough to interfere with simultaneous unmodified transmissions from another one of the terrestrial-based positioning beacons at the receiver. Also, the receiver may be further configured to receive and process modified transmissions from the at least one terrestrial-based positioning beacon at the one or more non-trivial power levels while simultaneously receiving and processing the unmodified transmissions from the another one of the terrestrial-based positioning beacons at the one or more non-trivial power levels.

According to some embodiments, a terrestrial-based positioning beacon may include an antenna that is configured to transmit unmodified transmissions at one or more non-trivial power levels to a terrestrial-based positioning receiver. The unmodified transmissions from antenna may be sufficiently powerful enough to interfere with simultaneous unmodified transmissions from one or more other terrestrial-based positioning beacons to the terrestrial-based positioning receiver. Also, the antenna may be further configured to transmit modified transmissions at the one or more non-trivial power levels to the terrestrial-based positioning receiver simultaneously with the unmodified transmissions from the one or more other terrestrial-based positioning beacons.

In some embodiments, the antenna may be further configured to transmit the modified transmissions to the terrestrial-based positioning receiver in response to an identification of potential interference with the unmodified transmissions from the antenna to the terrestrial-based positioning receiver.

DETAILED DESCRIPTION

Figure 1A:
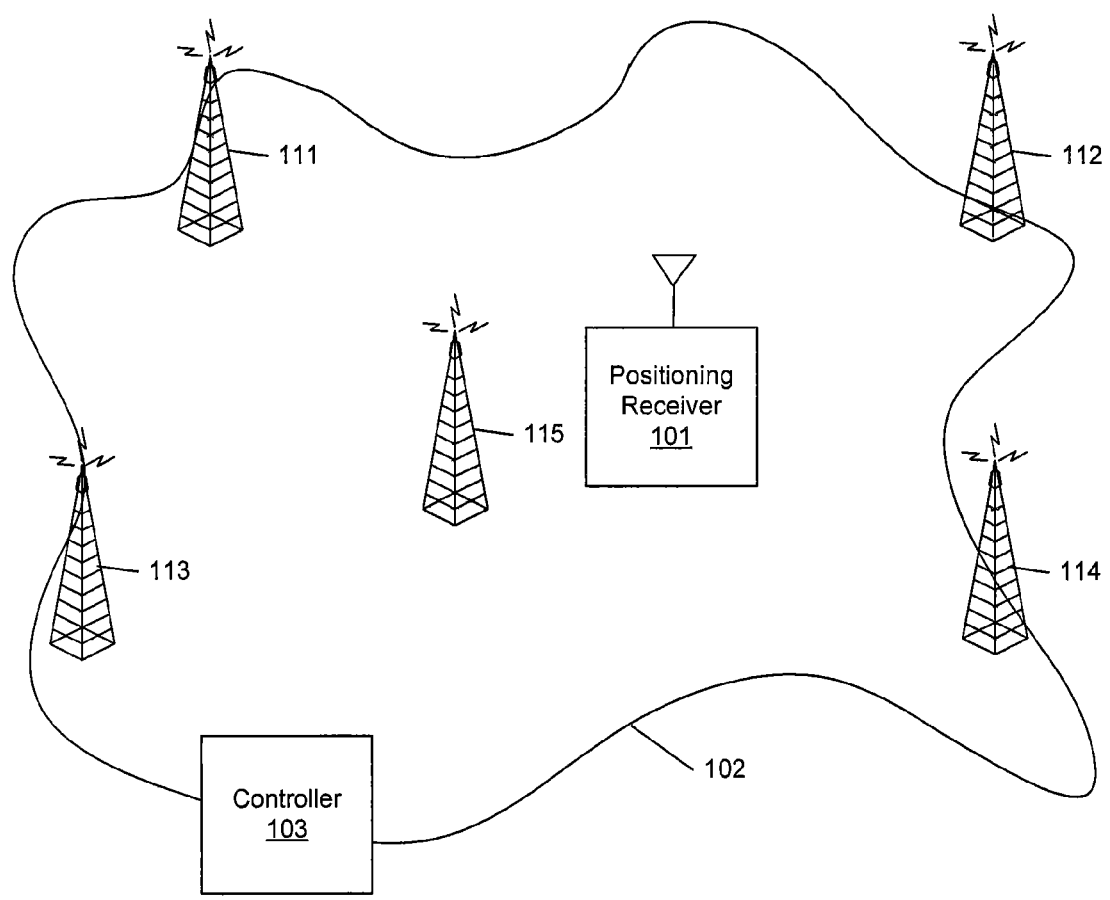
FIGS. 1A and 1B are a schematic diagrams illustrating a Terrestrial-based Beacon Network (TBN), according to various embodiments described herein.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or". Also, the phrase "at least one of" includes any and all combinations of one or more of the associated listed items.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

It should also be noted that in some alternate implementations, the functions/acts noted in the flowchart blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts may be separated into multiple blocks and/or the functionality of two or more blocks of the flowcharts may be at least partially integrated.

As used herein, the terms "receiver", "positioning receiver", and "terrestrial receiver" include electronic devices that can receive positioning signals (e.g., signals that are used to determine the position location of the "receiver"). For example, the terms include cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver, and also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Additionally, the terms "beacon" and "beacons" include beacons that can transmit positioning signals. The beacons may be at fixed geographic locations and/or may be portable, transportable, installed in a vehicle (aeronautical, maritime, or land-based). However, the beacons are not fixed to a satellite.

Systems and/or methods described herein may address interference problems (e.g., near-far problems and/or multipath problems) in a manner that may reduce the time required to acquire signals, as well as potentially simplifying beacon design. These systems/methods may also improve the performance of a terrestrial-based positioning receiver (e.g., any type of electronic device that is configured to receive positioning signals) while in a tracking mode. Moreover, a combination of several techniques can be used to mitigate or reduce the impact of interference problems. For example, techniques relating to power control, beacon transmit antenna patterns, signal bandwidths, and/or network design may be combined with known techniques such as extending the dynamic range of a terrestrial-based positioning receiver to address near-far problems. Such a system can improve the overall performance of a TBN in a GPS-assisted system. On a stand-alone basis, a TBN for position location may also have improved performance in a majority of the geographical locations. Although a small fraction of a geographical area may still be subject to near-far problems, the vast majority of area (e.g., a design parameter greater than 50% in some embodiments, greater than 90% in other embodiments, and greater than 99% in yet other embodiments) may have improved performance. The remaining areas (for example, a design parameter such as less than 1%) can be addressed by other methods, even in a stand-alone network of terrestrial beacons. In a GPS-assisted system, remaining areas of near-far problems may be even less of a problem. The techniques described herein may benefit from a careful network design and may also provide increased performance.

Referring now to FIG. 1A, a TBN that includes beacons 111-115 is illustrated along with a terrestrial-based positioning receiver 101 (e.g., a "terrestrial receiver" or a "positioning receiver"), according to various embodiments described herein. Additionally, a controller 103 may control transmissions from one or more of the beacons 111-115. The controller 103 may be external/internal to one or more of the beacons 111-115. Although FIG. 1A illustrates the five beacons 111-115, TBNs including more or fewer beacons will be understood by those skilled in the art. Moreover, in some embodiments, the TBN including the beacons 111-115 may be part of a Wide Area Positioning System (WAPS).

A plurality of the beacons 111-115 may cover a geographical area 102 to provide positioning signals to the positioning receiver 101 within the geographical area 102. In some embodiments, the positioning receiver 101 may be a GPS receiver, and the beacons 111-115 may provide GPS location assistance to the GPS receiver. Many of the beacons, such as the beacons 111-114, may be located at or near the boundary of the geographical area 102. Additionally, some beacons, such as the beacon 115, may be located well inside the geographical area 102. The positioning receiver 101 can be located anywhere inside the geographical area 102 and, in particular, may be located in an area that has poor satellite reception, such as in a building or other shadowed location. Although FIG. 1A illustrates a single positioning receiver 101, a plurality of positioning receivers may be located inside the geographic area 102. In some embodiments, hundreds, thousands, or more positioning receivers may be located inside the geographic area 102.

Figure 1B:
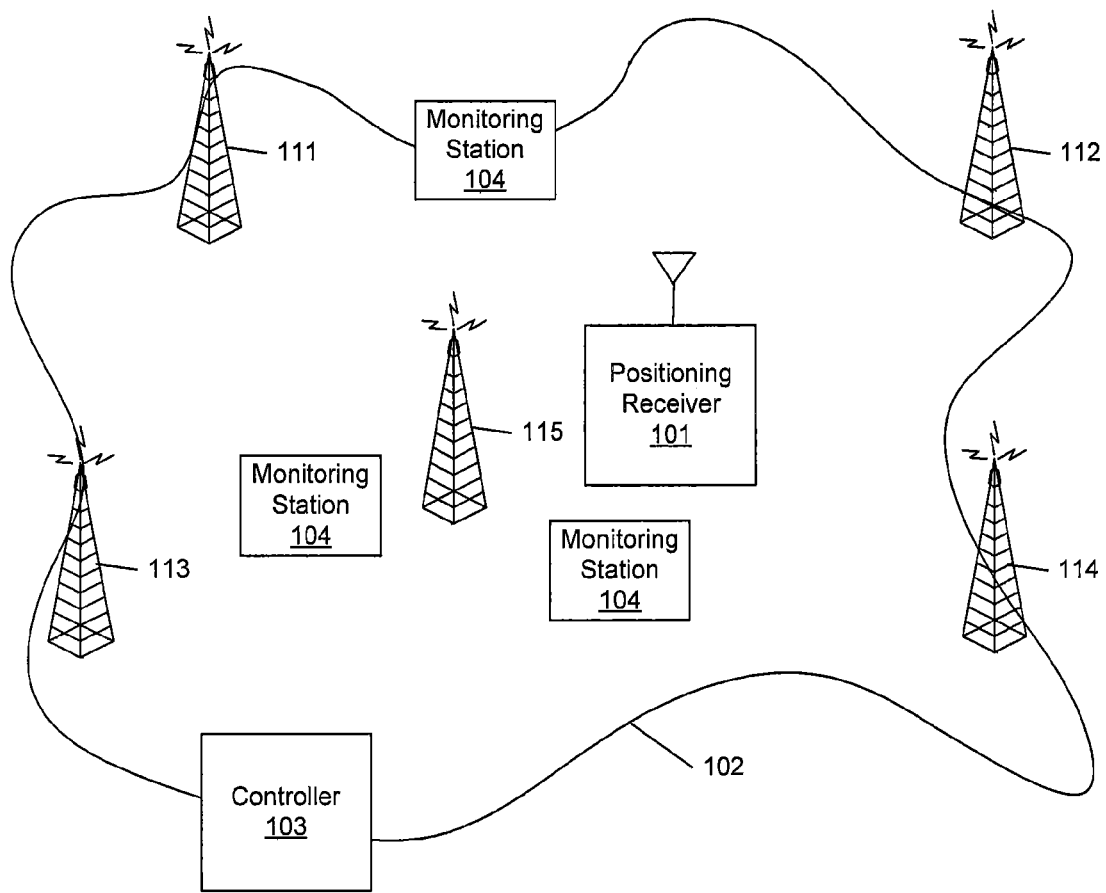

Referring now to FIG. 1B, one or more monitoring stations 104 may be placed at various locations within the geographical coverage area 102 to detect/report on signals transmitted by the beacons 111-115. For example, the monitoring station(s) 104 may report on positioning signals that are not successfully received by the positioning receiver 101 and/or the monitoring station(s) 104, and may also continually report on the quality of signals that are successfully received. The characteristics of a signal, such as received signal strength, bit error rate, frame error rate and/or other characteristics, may be characterized as a baseline. This baseline may be used as the basis for average behavior of a location, and may be used to characterize the average propagation losses associated with the path between one of the beacons 111-115 and the positioning receiver 101. Signal strength, forward error rate, bit error rate and/or any other technique that may be used to define the quality of the signal, may be communicated back to a controller (e.g., the controller 103) that can compare current results with the baseline. If one or more monitoring stations 104 show a change in the characteristics of the current results as compared to the baseline, decisions may be made in order to compensate for the change. The decisions may control aspects of the transmitter (e.g., one of the beacons 111-115) and/or of the content being transmitted. For example, if the monitoring stations 104 show an increase in path loss, there can be many ways to cause the system to compensate for this change.

Figure 1C:
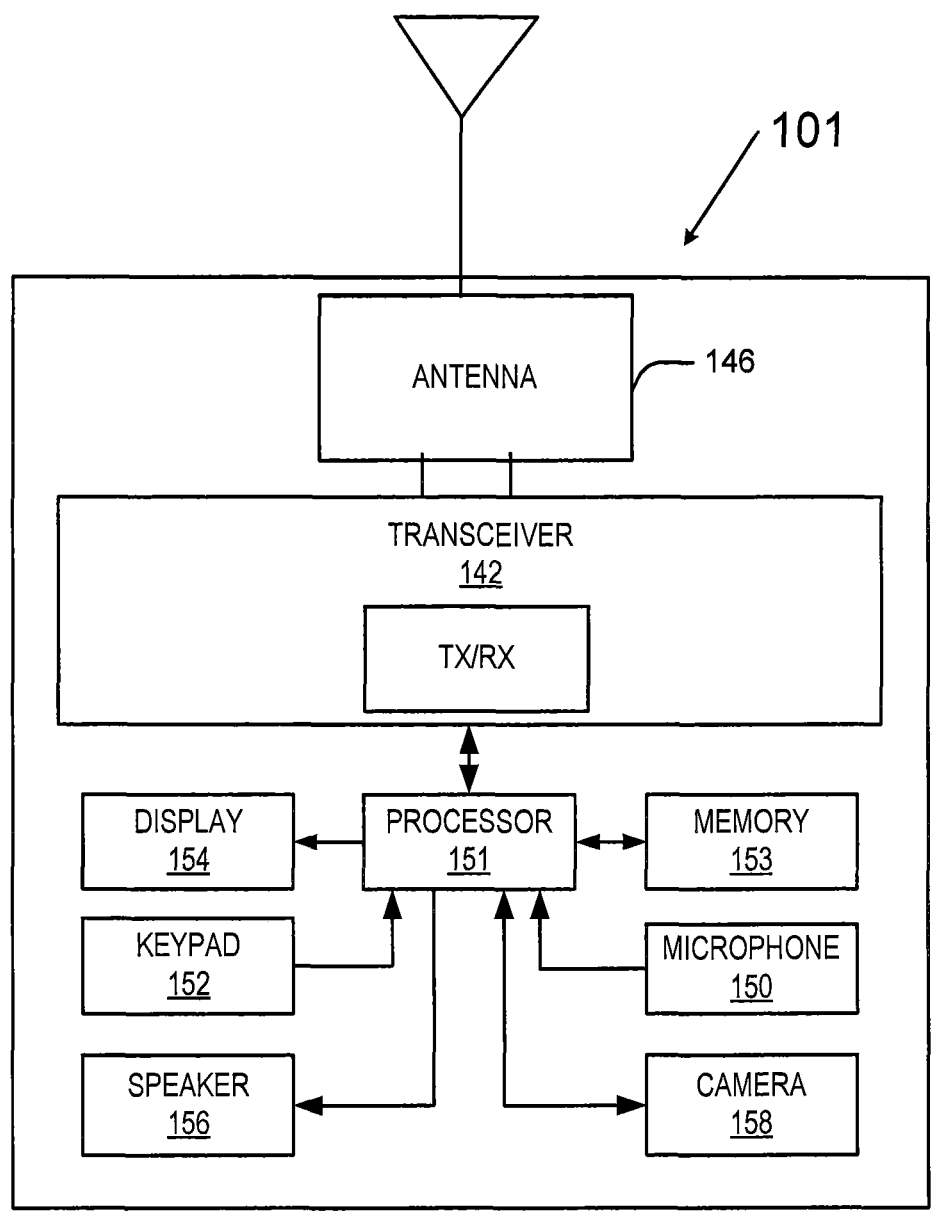
FIG. 1C is a block diagram of a positioning receiver that is illustrated in FIGS. 1A and 1B, according to various embodiments described herein.

Referring now to FIG. 1C, a block diagram is provided of the positioning receiver 101, according to various embodiments described herein. As illustrated in FIG. 1C, the positioning receiver 101 includes an antenna 146, a transceiver 142, and a processor 151, and can further include a display 154, keypad 152, speaker 156, memory 153, microphone 150, and/or camera 158. The monitoring stations 104 may include similar components to the positioning receiver 101, and may directly/indirectly communicate with the controller 103.

The transceiver 142 may include transmit/receive circuitry (TX/RX) that provides one or more communication paths for supplying/receiving Radio Frequency (RF) signals (e.g., positioning signals) to/from a radiating element of the antenna 146. A transmitter portion (optional in the positioning receiver 101) of the transceiver 142 converts information, which is to be transmitted by the positioning receiver 101, into electromagnetic signals suitable for radio communications. A receiver portion of the transceiver 142 demodulates electromagnetic signals, which are received by the positioning receiver 101 from the TBN and/or other communication networks to provide the information contained in the signals in a format understandable to a user of the positioning receiver 101.

Referring still to FIG. 1C, a memory 153 can store computer program instructions that, when executed by the processor circuit 151, carry out the operations described herein and shown in the figures.

The positioning receiver 101 may use signals transmitted from the terrestrial beacons 111-115 for position location determination purposes (e.g., for position determination in a stand-alone TBN or for GPS position assistance in a hybrid TBN). Referring again to the example illustrated in FIG. 1A, the positioning receiver 101 is located closest to the beacon 115, and the signal strength from the beacon 115 may be significantly higher than the signal strength from the beacons 111-114. Accordingly, the positioning receiver 101 may be overloaded due to the signal from the beacon 115. Systems and/or methods according to embodiments described herein can mitigate this problem to a significant degree, however.

Figure 2A:
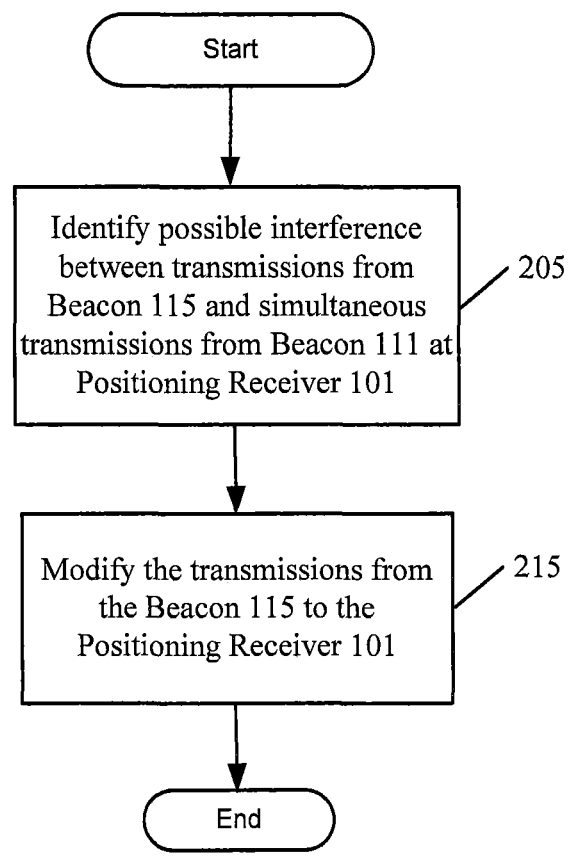
FIGS. 2A-2D are flowcharts illustrating modifying transmissions from a TBN to a positioning receiver, according to various embodiments described herein.

Referring now to FIG. 2A, a flowchart illustrates communications of the beacons 111-115 with the positioning receiver 101, according to various embodiments described herein. In particular, Block 205 of FIG. 2A illustrates identifying possible interference (e.g., in the form of a near-far problem) between transmissions from one of the beacons 111-115 (e.g., the beacon 115) and simultaneous transmissions from at least another one of the beacons 111-115 (e.g., the beacon 111). As an example, identifying the possible interference (Block 205) may include determining that transmissions from a first beacon (e.g., the beacon 115) are sufficiently powerful enough to interfere with simultaneous transmissions from a second beacon (e.g., the beacon 111) at the positioning receiver 101. Additionally or alternatively, identifying the possible interference (Block 205) may include detecting actual interference at the positioning receiver 101. In some embodiments, the identification of possible interference (Block 205) may performed using the controller 103 and/or the monitoring stations 104 (illustrated in FIG. 1B).

Moreover, the identification of potential interference (Block 205) may be performed during a design phase for the TBN, during field testing of the TBN, and/or in real-time (e.g., after designing and/or testing the TBN). For example, in some embodiments, the possible interference may be identified (Block 205) using theoretical models (e.g., models of a network coverage plan) that enable a designer of the TBN to plan a signal adjustment scheme (e.g., power control) based on estimated/predicted conditions (e.g., possible interference locations). Additionally or alternatively, the signal adjustment scheme may be adjusted after designing the TBN (e.g., during field testing or in real-time during formal operations of the TBN). For example, possible interference may be identified (Block 205) based on signals transmitted by one or more of the beacons 111-115 and detected by the positioning receiver 101, one or more of the beacons 111-115, and/or one or more other devices that can operate as monitoring stations (e.g., the monitoring stations 104). As an example, at least one of the beacons 111-115 may observe signals transmitted from other ones of the beacons 111-115 to identify possible interference (Block 205). In some embodiments, the positioning receiver 101 can report on the detected interference (e.g., via transmissions from the positioning receiver 101 to the controller 103, the monitoring stations 104, and/or one or more of the beacons 111-115).

Referring still to FIG. 2A, in response to identifying the possible interference in Block 205, the transmissions from the beacon 115 to the positioning receiver 101 may be modified (Block 215). For example, modifying the transmissions from the beacon 115 may include modifying at least one of (a) transmit power, (b) antenna pattern, and (c) bandwidth for signals transmitted from the beacon 115 to the positioning receiver 101.

Figure 2B:
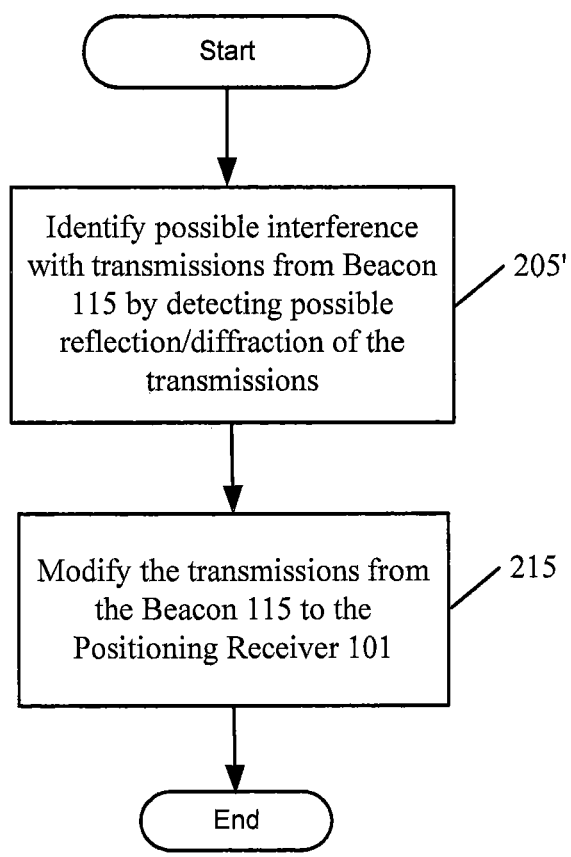

Referring now to FIG. 2B, although Block 205 of FIG. 2A illustrates the possible interference as being between transmissions of different beacons, the possible interference may additionally or alternatively be interference in the form of a multipath problem. Accordingly, in some embodiments, the possible interference may be identified (Block 205') by detecting reflected/diffracted signals from at least one beacon (e.g., the beacon 115).

Figure 2C:
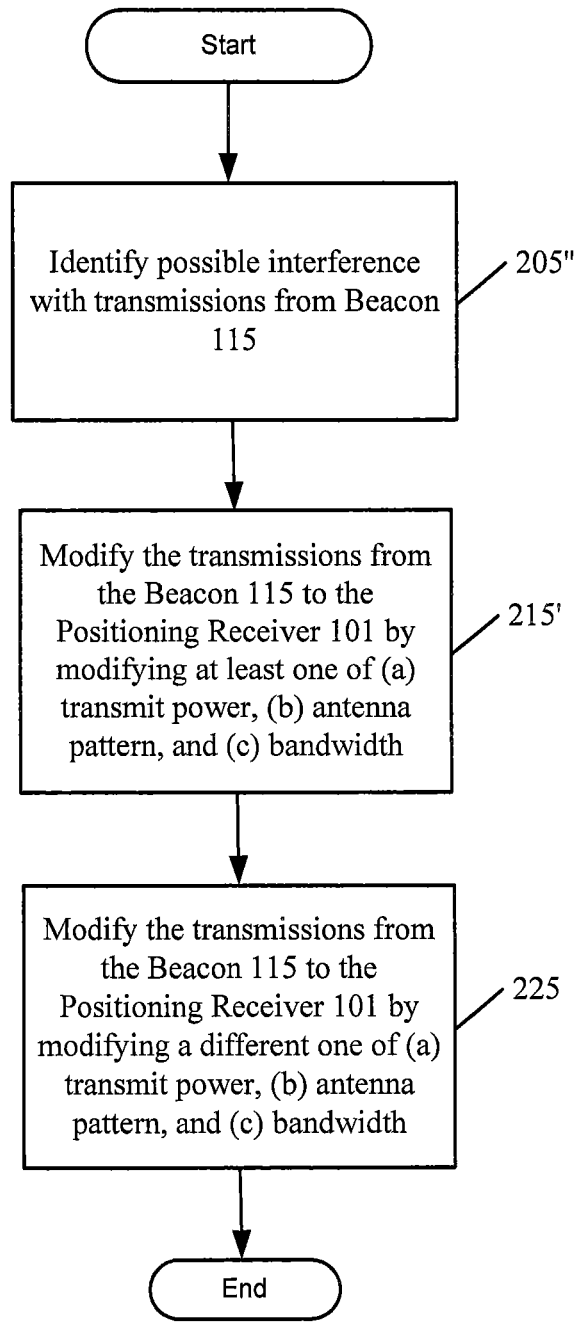

Referring now to FIG. 2C, after identifying the possible interference (Block 205') and modifying the transmissions (Block 215') by modifying at least one of (a) transmit power, (b) antenna pattern, and (c) bandwidth for signals transmitted from the beacon 115 to the positioning receiver 101, the transmissions may be further modified in Block 225 by modifying a different one of (a) transmit power, (b) antenna pattern, and (c) bandwidth for signals transmitted from the beacon 115 to the positioning receiver 101. For example, if the beacon 115 modifies its transmit power in Block 215', then the beacon 115 may modify the bandwidth of its transmissions in Block 225. In some embodiments, the further modification (Block 225) may be performed in response to identifying possible interference with transmissions from the beacon 115 after performing the first modification(s) in Block 215'.

Figure 2D:
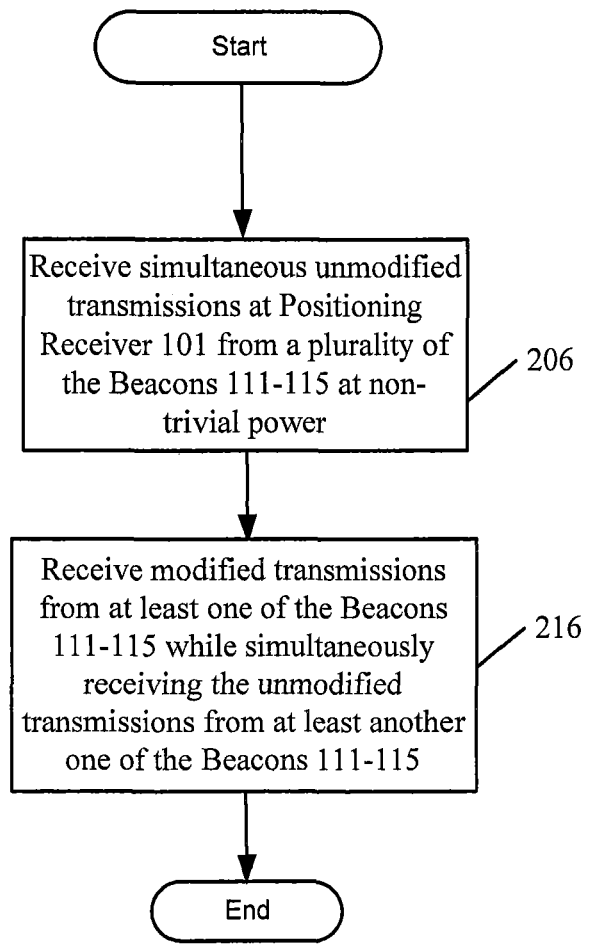

Referring now to FIG. 2D, from the perspective of the positioning receiver 101, simultaneous unmodified transmissions may be received from a plurality of terrestrial-based positioning beacons (e.g., a plurality of the beacons 111-115) at one or more non-trivial power levels (e.g., power levels at which the positioning receiver 101 is configured to receive and process each of the respective transmissions/signals), as illustrated in Block 206. The unmodified transmissions from at least one of the terrestrial-based positioning beacons (e.g., the beacon 115) may be sufficiently powerful enough to interfere with simultaneous unmodified transmissions from another one of the terrestrial-based positioning beacons (e.g., the beacon 111) at the positioning receiver 101. As illustrated in Block 216, after receiving the simultaneous unmodified transmissions from the plurality of terrestrial-based positioning beacons, the positioning receiver 101 may receive modified transmissions from the at least one terrestrial-based positioning beacon (e.g., the beacon 115) at the one or more non-trivial power levels while simultaneously receiving the unmodified transmissions from at least another one of the terrestrial-based positioning beacons (e.g., the beacon 111) at the one or more non-trivial power levels. Additionally, transmissions from the terrestrial-based positioning beacons may include a variety of information (e.g., information regarding signal quality or information regarding the power level of a beacon). In some embodiments, the positioning receiver 101 may process the transmitted signals differently based on such information.

Power Control

One approach for mitigating interference problems (e.g., the near-far problem) is to dynamically control the transmit power of one or more of the beacons 111-115 based on RF characteristics of the TBN. For example, referring again to FIG. 1A, the beacon 115 may be positioned near a plurality of neighboring terrestrial beacons, such as the four neighboring beacons 111-114. The transmit power level of the beacons 111-115 may be adjusted for various durations (such as slots/sub-frames within a frame) to minimize/reduce overload problems near these sites.

According to some embodiments, a frame having a predefined duration is defined. The frame may be divided into an arbitrary number of sub-frames. Each of the sub-frames may have a duration that is fixed or variable. Moreover, each of the sub-frames may have equal or unequal durations. Depending on the application, a sub-frame can be of any duration from a few milliseconds, or less, to hundreds of milliseconds, or more.

Figure 3A:
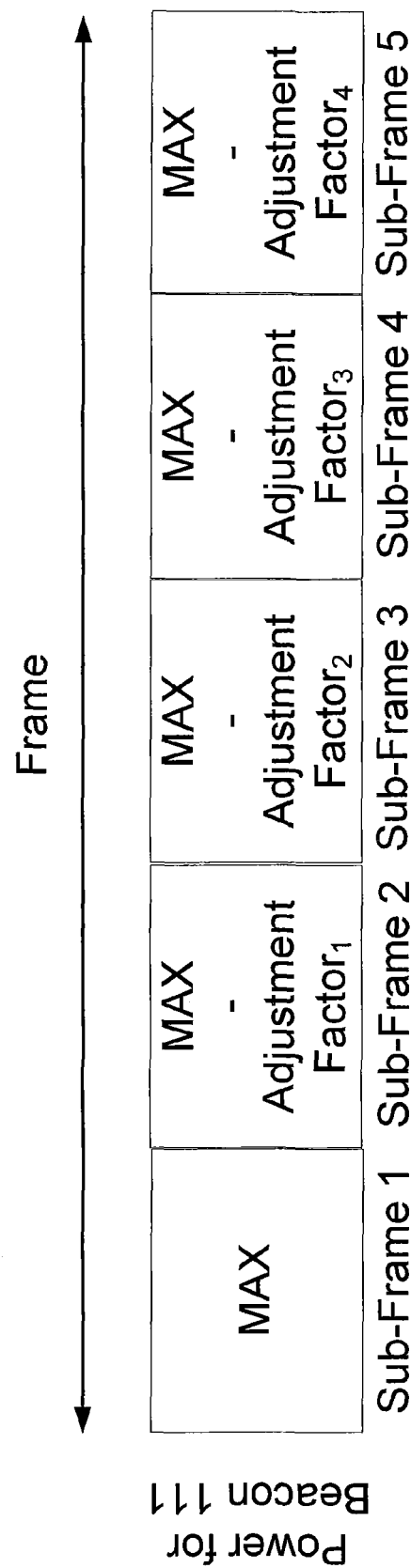
FIG. 3A is a diagram illustrating transmit power levels for a beacon in a TBN during a frame, according to various embodiments described herein.

Referring now to FIG. 3A, transmit power levels for a beacon in a TBN during a frame are illustrated in a diagram, according to various embodiments described herein. In particular, FIG. 3A illustrates the transmit power levels for the beacon 111 during a frame. As indicated in FIG. 3A, the frame includes a plurality of sub-frames. Each sub-frame may have a different power level at which the beacon 111 transmits. For example, FIG. 3A indicates a maximum power level for the beacon 111 in sub-frame 1. FIG. 3A further indicates a power level for the beacon 111 in each other sub-frame that is calculated by the formula of (maximum power) minus (an adjustment factor) for sub-frames 2-5. The adjustment factor may be different for each of the sub-frames 2-5 or it may be the same for some or all of the sub-frames 2-5. Alternatively, in some embodiments, the beacon 111 may have a maximum power level at one or more of the sub-frames 2-5. Additionally, in some embodiments, the beacon 111 may transmit at a power level other than the maximum power level in sub-frame 1.

Moreover, the maximum transmit power at each of the beacons 111-115 may be different. For example, the maximum transmit power at the beacon 111 may be greater than the maximum transmit power at the beacon 115. Alternatively, the maximum transmit power at the beacon 115 may be greater than the maximum transmit power at the beacon 111.

The actual power transmitted from each of the beacons 111-115 for a given sub-frame may be determined by calculating the maximum allowed power for a particular one of the beacons 111-115 minus the adjustment factor. The adjustment factor may be based on network topology, the need for GPS assistance for an area surrounding one of the beacons 111-115, other radio propagation factors, and/or antenna pattern shaping for a given one of the beacons 111-115. For example, one of the beacons 111-115 located at a high elevation site with no surrounding buildings or other man-made structures or a forest (i.e., an open area) may not need any adjustment factor or antenna shaping. Nearby such a site, a satellite-based system may do an adequate job of providing position location information. This site, if run at full/maximum power in all sub-frames, may assist areas which are not nearby and not subject to overload from this site. On the other hand, a site in the middle of man-made structures may require its power to be significantly reduced in many sub-frames and may require antenna shaping. Accordingly, a combination of power adjustment and antenna shaping may improve near-far mitigation in some situations.

Based on the calculated adjustment factors, a matrix can be generated that defines maximum transmit power for each of the beacons 111-115 in each sub-frame, as illustrated in Table 1, below.

TABLE 1

| | | Transmit Levels | | | | | |
| --- | --- | --- | --- | --- | --- | --- | --- |
| | | Sub-Frame | | | | | |
| | | 1 | 2 | 3 | 4 | 5 | N |
| Beacon | 111 | MAX | MAX − $\Delta_{12}$ | MAX − $\Delta_{13}$ | MAX − $\Delta_{14}$ | MAX − $\Delta_{15}$ | MAX − $\Delta_{1N}$ |
| | 112 | MAX − $\Delta_{21}$ | MAX | MAX − $\Delta_{23}$ | MAX − $\Delta_{24}$ | MAX − $\Delta_{25}$ | MAX − $\Delta_{2N}$ |

TABLE 1-continued

Transmit Levels

| | Sub-Frame | | | | | |
|---|---|---|---|---|---|---|
| | 1 | 2 | 3 | 4 | 5 | N |
| 113 | MAX − $\Delta_{31}$ | MAX − $\Delta_{32}$ | MAX | MAX − $\Delta_{34}$ | MAX − $\Delta_{35}$ | MAX − $\Delta_{3N}$ |
| 114 | MAX − $\Delta_{41}$ | MAX − $\Delta_{42}$ | MAX − $\Delta_{43}$ | MAX | MAX − $\Delta_{45}$ | MAX − $\Delta_{4N}$ |
| 115 | MAX − $\Delta_{51}$ | MAX − $\Delta_{52}$ | MAX − $\Delta_{53}$ | MAX − $\Delta_{54}$ | MAX | MAX − $\Delta_{5N}$ |
| N | MAX − $\Delta_{N1}$ | MAX − $\Delta_{N2}$ | MAX − $\Delta_{N3}$ | MAX − $\Delta_{N4}$ | MAX − $\Delta_{N5}$ | MAX |

As shown in Table 1, each beacon 111 ... 115 ... N is assigned a corresponding sub-frame 1 ... 5 ... N, during which it transmits at maximum power. In the other sub-frames, the beacon transmits at a maximum power level that is adjusted by an adjustment factor $\Delta_{i,j}$ that is determined in the manner described above. As an example, the maximum power level for each of the beacons 111-115 may be about thirty (30) Watts, and the power levels may be reduced by power control to as low as about one (1) Watt, or even under one (1) Watt. For example, one or more power levels may be reduced by one or more steps (e.g., three (3) decibel (dB) steps or fifteen (15) dB steps) down to less than about one (1) Watt. Other maximum power levels and/or reduced power levels will be understood by those skilled in the art. Moreover, although all of the maximum power levels for all of the beacons 111-N in Table 1 are indicated by "MAX," it will be understood by those skilled in the art that the maximum power level may be different at different ones of the beacons 111-N. For example, the maximum power level at the beacon 111 may be greater than the maximum power level at the beacon 115, or vice versa.

Figure 3B:
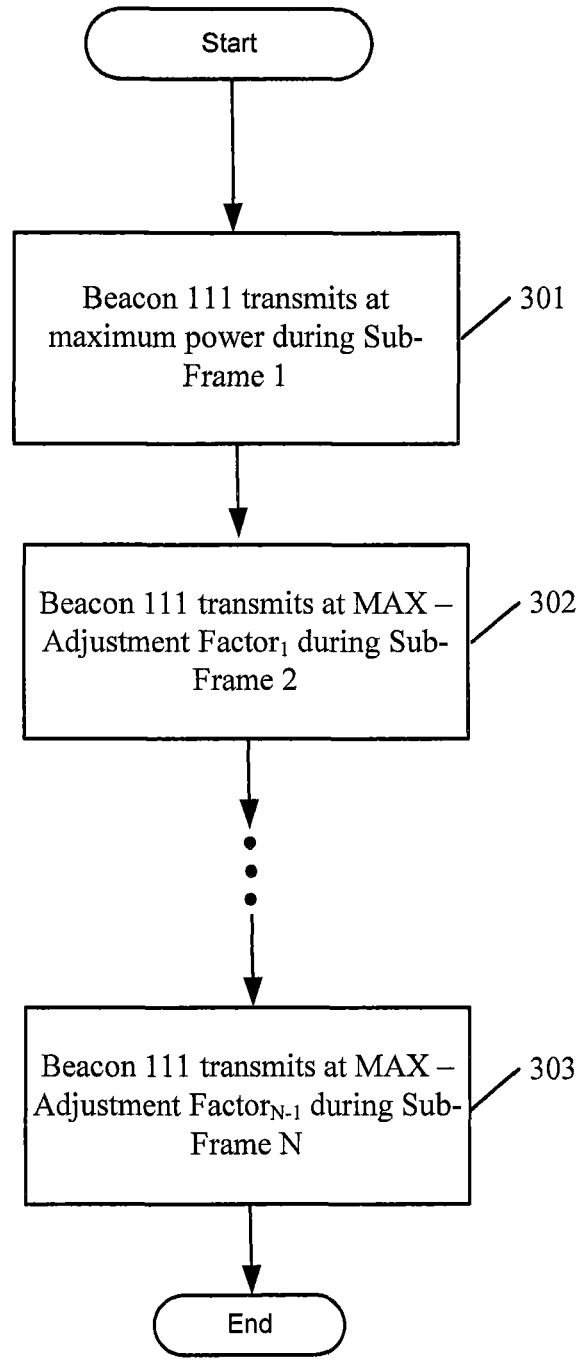
FIGS. 3B-3E are flowcharts illustrating transmitted power levels for a beacon in a TBN during a frame, according to various embodiments described herein.

Referring now to FIGS. 3B-3E, flowcharts are provided illustrating transmitted power levels for a beacon in a TBN during a frame, according to various embodiments described herein. For example, FIG. 3B illustrates that the beacon 111 transmits at its maximum power level in sub-frame 1 (Block 301) and transmits at the maximum power level minus a corresponding adjustment factor in sub-frame 2 (Block 302). Also, given N sub-frames, the beacon 111 will transmit at its maximum power minus a corresponding adjustment factor in sub-frame 3 through sub-frame N, as illustrated in Block 303.

Figure 3C:
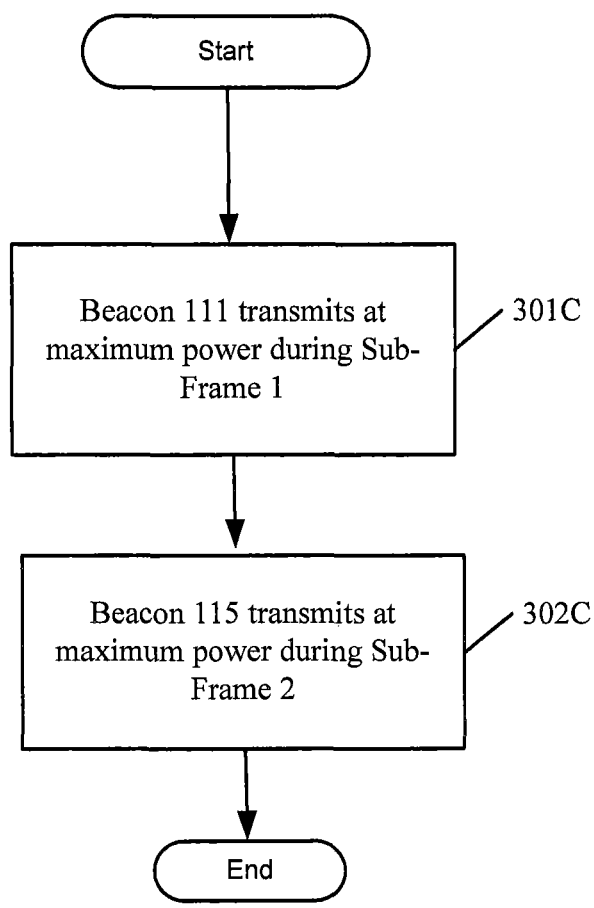

Referring now to FIG. 3C, each of the beacons 111-115 within the given geographical area 102 may be assigned a sub-frame during which the beacon may transmit at its maximum power level. For example, the beacon 115 may transmit at its maximum power level for a given duration (such as a sub-frame) while the neighboring beacons 111-114 may transmit at their maximum power levels or at reduced power levels during that time. As an example, the beacon 111 may transmit at its maximum power level during sub-frame 1 (Block 301C), and the beacon 115 may transmit at its maximum power level during sub-frame 2 (Block 302C).

Figure 3D:
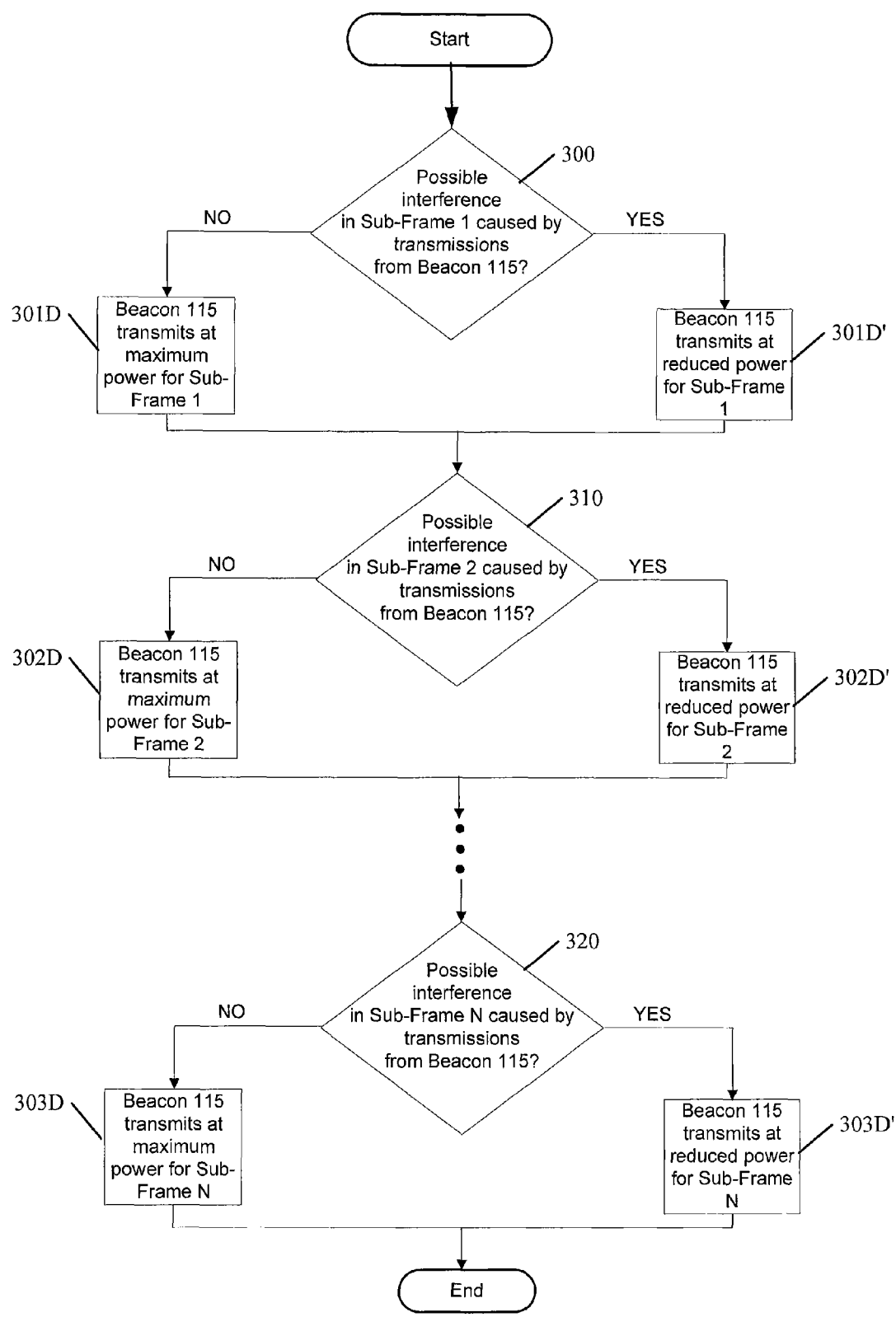

Referring now to FIG. 3D, according to various embodiments described herein, each one of the beacons 111-115 determines for each sub-frame whether to transmit at maximum power or at a reduced power level. For example, Blocks 300, 310, and 320 correspond to determinations of possible interference caused by transmissions from the beacon 115 in respective sub-frames. The beacon 115 transmits at its maximum power level if possible interference is not identified, as illustrated in Blocks 301D, 302D, and 303D. On the other hand, the beacon 115 transmits at reduced power if the possible interference is identified, as illustrated in Blocks 301D', 302D', and 303D'.

For example, the beacon 115 may decide to reduce its power level for a given sub-frame based on a determination that a high transmit power may overload, or otherwise interfere with, other ones of the beacons 111-114. In particular, if ones of the beacons 111-115 are located in an urban area, they may be likely to interfere with one another, and at least one of the beacons 111-115 may reduce its transmit power for one or more sub-frames to reduce/minimize interference. In some embodiments, one or more of the beacons 111-115 may transmit at maximum power on all sub-frames except for time periods when power needs to be reduced to reduce/minimize overload, as determined on a case-by-case basis.

In a manner similar to how a given geographical area in cellular mobile radio systems may be covered by multiple cell sites, the geographical area 102 may be covered by multiple beacons 111-115. As the distance between two of the beacons 111-115 increases, a given Code Division Multiple Access (CDMA) code can be reused without any co-code interference. This mechanism may define a reuse pattern for the geographical area 102. A frame duration may be a multiple of the duration of sub-frames and the number of beacons in the reuse pattern.

Figure 3E:
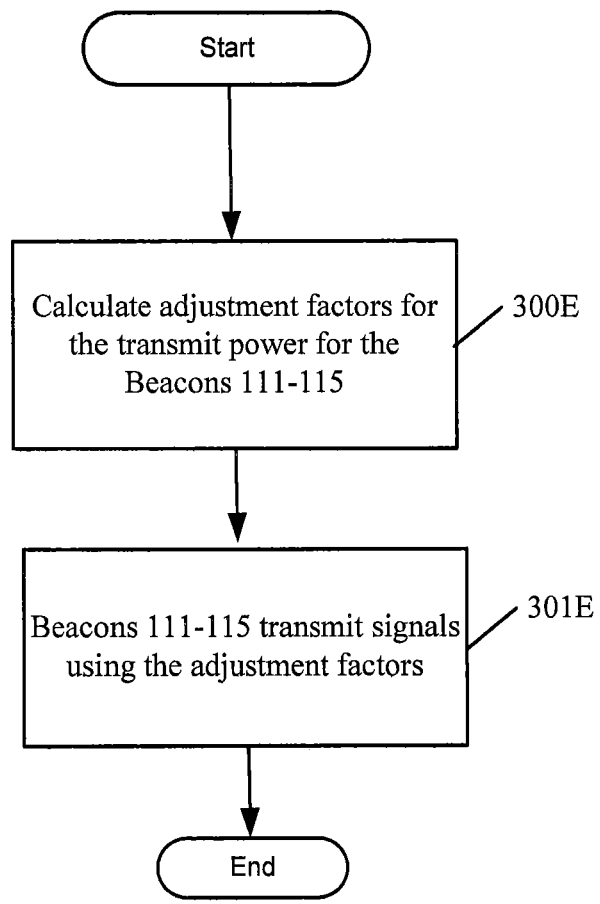

Referring now to FIG. 3E, adjustment factors may be calculated for the transmit power for each of the beacons 111-115 (Block 300E). The adjustment factors may determine whether and/or by how much the transmit power levels for the beacons 111-115 are reduced in each sub-frame. After calculating the adjustment factors (Block 300E), the beacons 111-115 may transmit their signals using the adjustment factors (Block 301E).

The network of beacons 111-115 may cover the geographical area 102 to provide RF coverage. This RF coverage may include the location of the beacons 111-115, design parameters for the beacons 111-115 such as antenna height, desired power level (which may begin at the maximum level), assignment of CDMA codes for each of the beacons 111-115, and a nominal antenna pattern which may provide improved near-field protection.

Figure 4A:
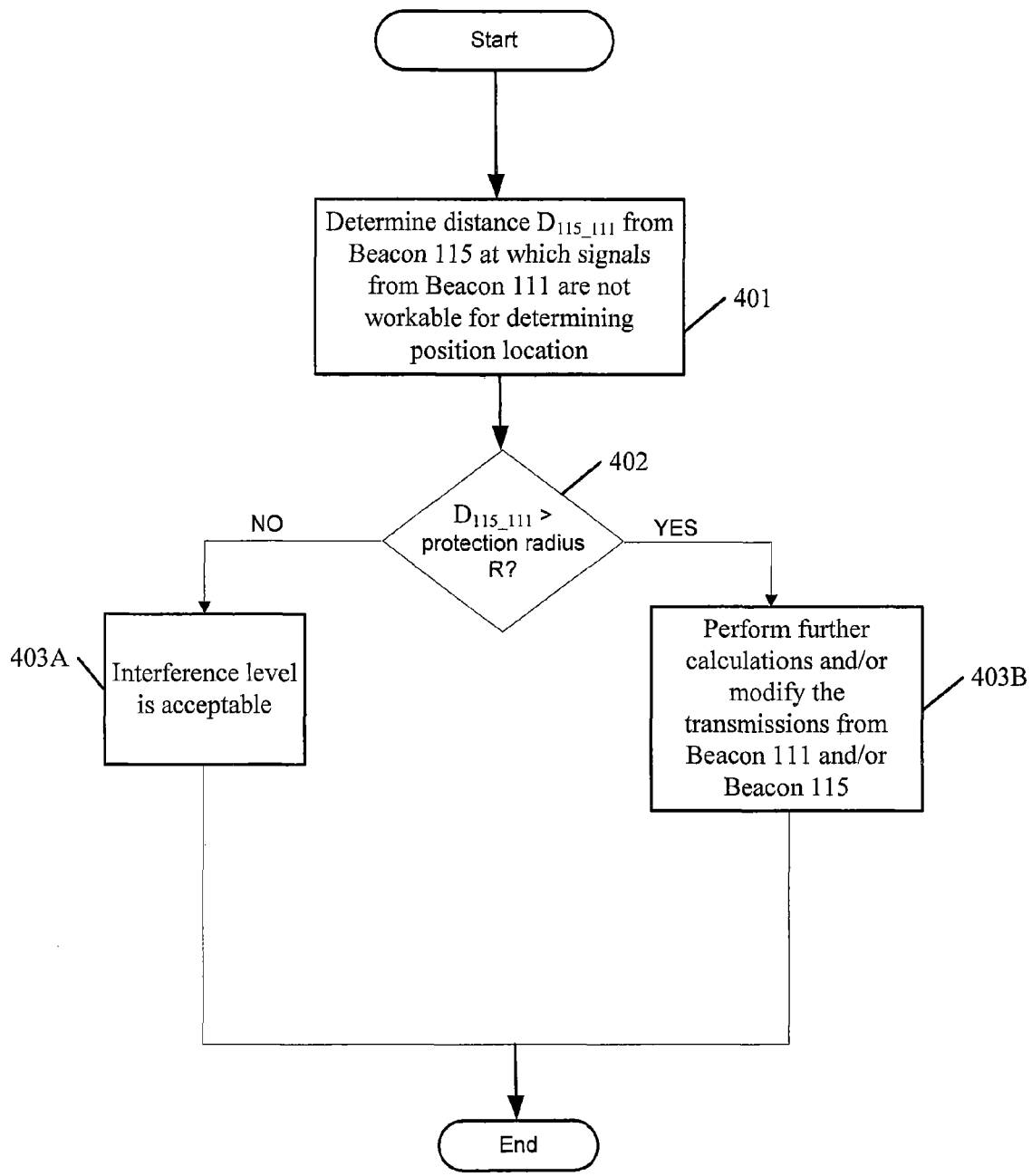
FIG. 4A is a flowchart illustrating distances with respect to a beacon in a TBN, according to various embodiments described herein.
Figure 4B:
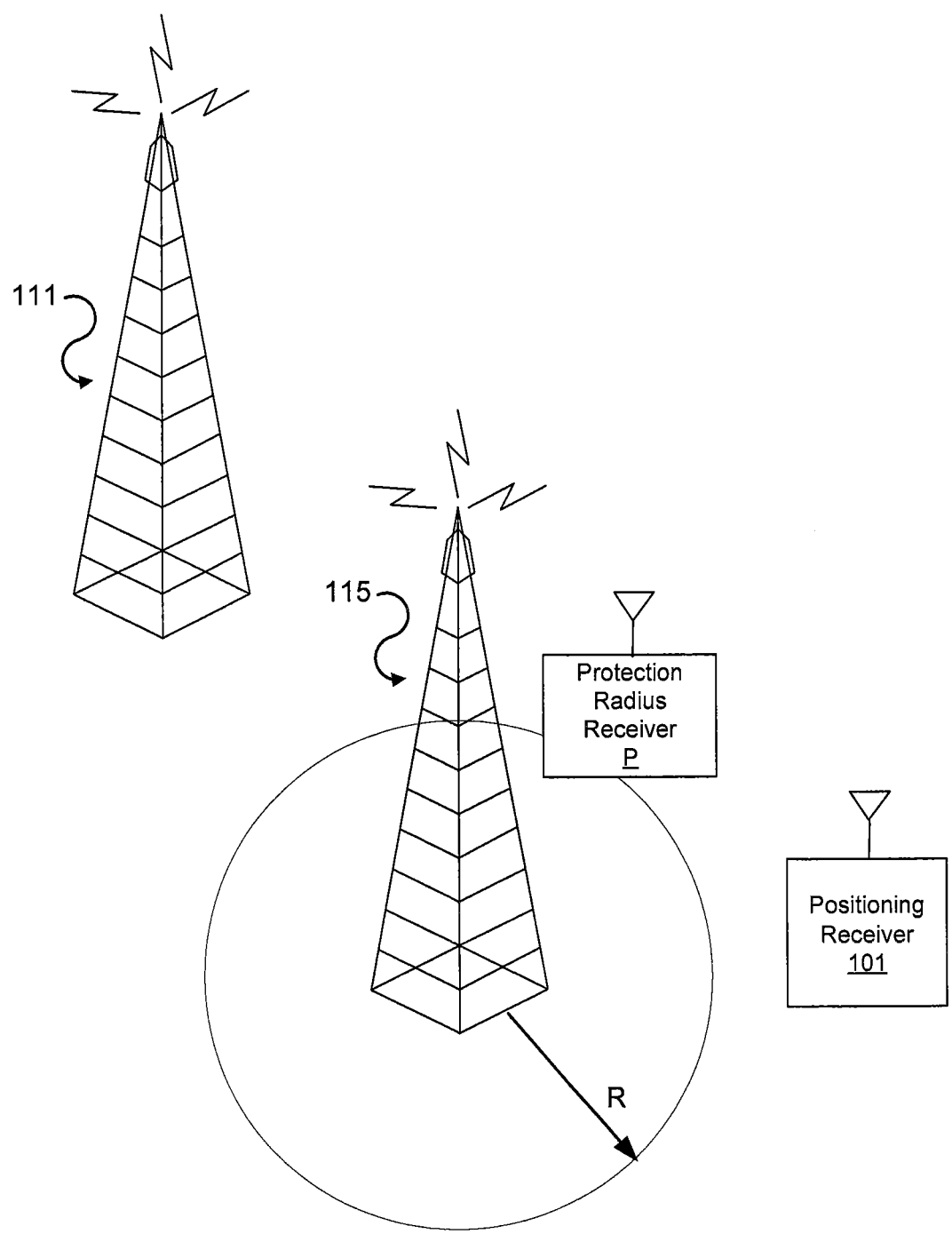
FIG. 4B is a schematic diagram illustrating a protection radius with respect to a beacon in a TBN, according to various embodiments described herein.

Referring now to FIG. 4B, after determining the RF coverage, a radius R may be selected/determined outside of which harmful intra-system interference (e.g., interference with other beacons' signals near a given beacon which will make the location determination difficult/impossible) is not acceptable and within which intra-system interference is acceptable. The radius R may be a protection radius. The protection radius R may generally be constant. However, the protection radius R may also change on a substantially immediate basis based on considerations such as the time of day or the location of beacons or receivers. The radius R may be selected/determined based on a desired application (such as locating devices and/or persons inside man-made structures, aviation, vehicles) and based on whether the network is a hybrid (e.g., a system that makes use of GPS and a TBN) or a stand-alone TBN. The radius R may be $R_{is}$ for a stand-alone terrestrial beacon system and $R_{ih}$ for a hybrid system. $R_{is}$ may be less than $R_{ih}$ because a stand-alone network may require more protection.

Referring now to FIG. 4A, a flowchart is provided illustrating distances with respect to a beacon in a TBN, according to various embodiments described herein. After selecting/determining the radius R, interference analysis may be performed for one or more of the beacons 111-115. For example, the near-field electromagnetic pattern at the beacon 115 may be calculated/measured for signals transmitted from the beacon 111. These calculations may account for path loss from the beacon 115 to the beacon 111 and/or other factors (such as cross-correlation for assigned CDMA codes and/or local morphology near the beacon 115 and the beacon 111). Based on the near-field signal strength and/or based on the positioning receiver 101, which can tolerate a certain level of intra-system interference (e.g., some receivers may tolerate intra-system interference because a standard GPS receiver may work on a single frequency), the distance from the beacon 115 at which signals from the beacon 111 are not workable for determining position location may be calculated, as illustrated in Block 401. This distance may be referred to as $D_{115\_111}$. Blocks 402 and 403A illustrated that if $D_{115\_111} < R$, then no more calculations may be needed for the pair of beacons (115, 111). Accordingly, a value of $\Delta_{115\_111}$ may be set to zero, representing that a power adjustment may not be necessary for the pair of beacons (115, 111).

Alternatively, Blocks 402 and 403B illustrate that if $D_{115\_111} > R$, then further calculations may be necessary and/or a decision may be made to modify transmissions from the beacon 111 and/or the beacon 115. For example, if $D_{115\_111} > R$, then signal strength may be calculated at a distance from each of the beacons 115 and 111. As an example, the signal strength may be calculated at the distance R from each of the beacons 115 and 111. Next, the difference between signal strengths from the beacons 115 and 111 may be calculated as represented by the following formula:

$$X_R(115,111) = S_{115}(R) - S_{111}(R)$$

R may refer to a location or set of locations around beacon 115 at the distance R from the beacon 115. Similarly, $X_D(115,111) = S_{115}(D) - S_{111}(D)$. Accordingly, $$\Delta_{115\_111} = X_R(115,111) - X_D(115,111)$$

These calculations (or measurements) may be performed for each pair combination of terrestrial beacons in the TBN. For example, these calculations may be performed for the beacon 115 and the beacon 111, and may also be performed for other combinations of the beacons 111-115. If the network of terrestrial beacons is not modified, these calculations may be repeated.

In some embodiments, distance calculations from two beacons may be at respective radii from the beacons. In other embodiments, the distance calculations may be performed using the protection radius R instead of using multiple radii.

Referring again to FIG. 4B, a protection radius receiver P may be located at or near the protection radius R. The protection radius receiver P may estimate signals transmitted from the beacons 111-115 and may transmit information relating to the received signals to the beacons 111-115. In some embodiments, the protection radius receiver P may be one of the monitoring stations 104.

The protection radius receiver P may help to provide power control with an adaptive nature. For example, although adjustment factors may be constant, adjustment factors may alternatively be adaptively controlled. Over even a short duration of time (for example, a few subframes), signal strength may change. To adapt to changes in signal strength, the protection radius receiver P may provide feedback to one or more of the beacons 111-115. In particular, the protection radius receiver P may provide feedback to the beacon(s) 111-115 based on signals received from the beacon(s) 111-115. The feedback provided by the protection radius receiver P may include information for changing one or more adjustment factors. Accordingly, the protection radius receiver P may provide feedback for changing the adjustment factor(s) based on real-time signal measurements to provide adaptive control of the adjustment factor(s). Additionally or alternatively, power control may be performed based on anticipated coverage needs (e.g., based on the anticipated coverage needs for a particular time of day or day of the week).

Antenna Pattern Shaping

In some situations, a reduction in power level may not adequately mitigate an overload condition without a significant impact on the network performance. Accordingly, in some embodiments, an antenna pattern shaping technique may be used alone and/or together with the power control techniques described herein. Antenna pattern shaping can be applied in both vertical and horizontal planes. If significant signal blocking structures are very near a site, an antenna pattern, such as a vertical pattern, may be used to reduce the signal strength near a site. Since the signal strength near the site may be very strong, a reduction in power can still be sufficient to meet the requirements for a desired signal level for some situations. Another technique may include using lower side-band suppressed antennas to achieve a similar result. The use of upper side-band suppressed antennas has been proposed to avoid/reduce interference to a satellite network from a terrestrial-based network using the same frequency as a satellite network.

Lower side-band suppressed antennas may be used to address remaining near-far problems after using power control and/or other techniques. In particular, even after using power control and/or other techniques, a small area up to a distance W around one the beacons 111-115 may still be subject to the near-far problem. Assuming that the additional attenuation of the beacon signal strength is X decibels (dB), the signal strength may be reduced by X dB in the area around the one of the beacons 111-115 to the distance W and the near-far problem may be mitigated using lower sideband suppression unless a receiver is located within few meters from the beacon transmit antenna. However, well-designed beacons may be fixed, high-site towers, and it thus is unlikely that a GPS-augmented or stand-alone receiver will be close enough to the beacon transmit antenna to prevent mitigation by lower side-band suppression.

Figure 4C:
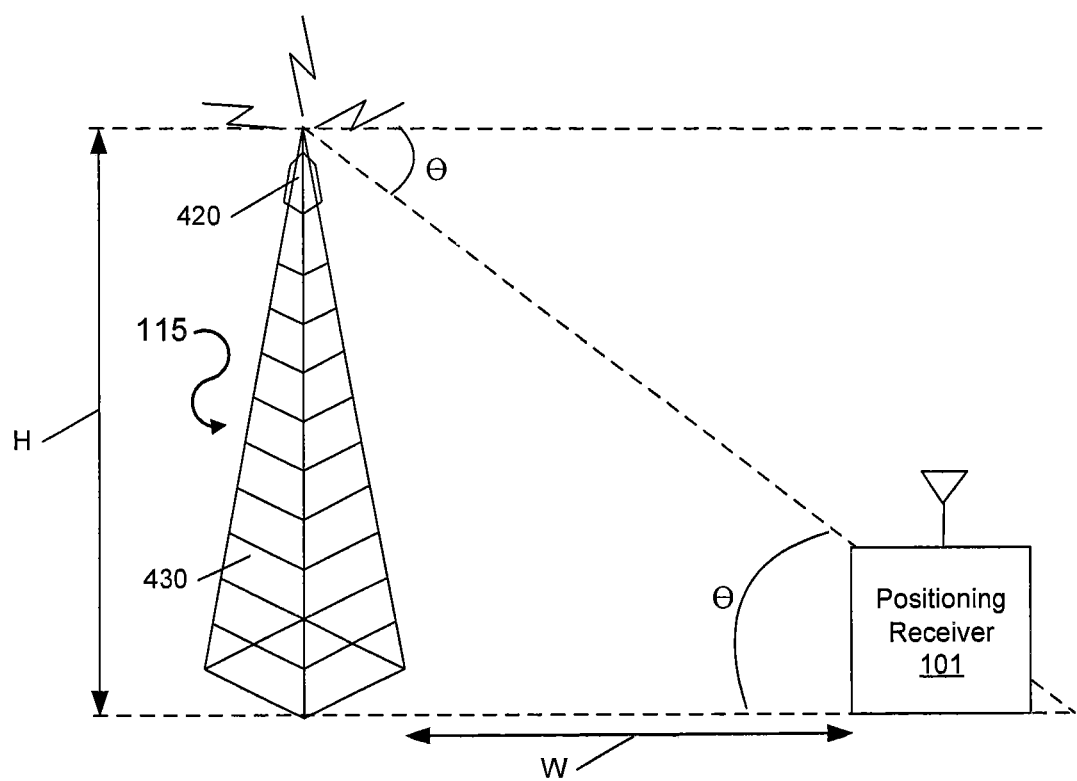
FIG. 4C is a schematic diagram illustrating the position of an antenna of a beacon in a TBN with respect to a positioning receiver, according to various embodiments described herein.

Referring now to FIG. 4C, the position of an antenna 420 of the beacon 115 in a TBN is illustrated with respect to the positioning receiver 101. In particular, FIG. 4C illustrates the beacon 115 including the antenna 420 mounted on an antenna support structure 430. The antenna 420 has an electromagnetic radiation pattern that has suppressed emissions at an elevational angle less than $-\theta°$. The vertical antenna pattern may be defined as $G(\theta)$, and may have a gain of at least X dB less than a main beam gain at $-90° <= \theta <= -\tan^{-1}(H/W)$, where H is the height of the beacon 115 and W is the distance from the antenna 420 at which the antenna gain is suppressed. That is, for a receiver (e.g., the positioning receiver 101) located within a distance W from the beacon 115, the gain of the antenna 420 may be X dB less than a main beam gain.

Smart Antennas

In some embodiments, smart antennas may be used to address near-far problems and/or multipath problems. For example, smart antennas may address these problems by switching between different fixed antenna beam patterns or by steering an antenna beam in any direction. As an example, smart antennas may be used to reduce/mitigate near-far problems and/or reduce/mitigate multipath problems associated with the TBN to assist position location determination of the positioning receiver 101. In other words, the antenna 420 illustrated in FIG. 4C may be a smart antenna.

Figure 4D:
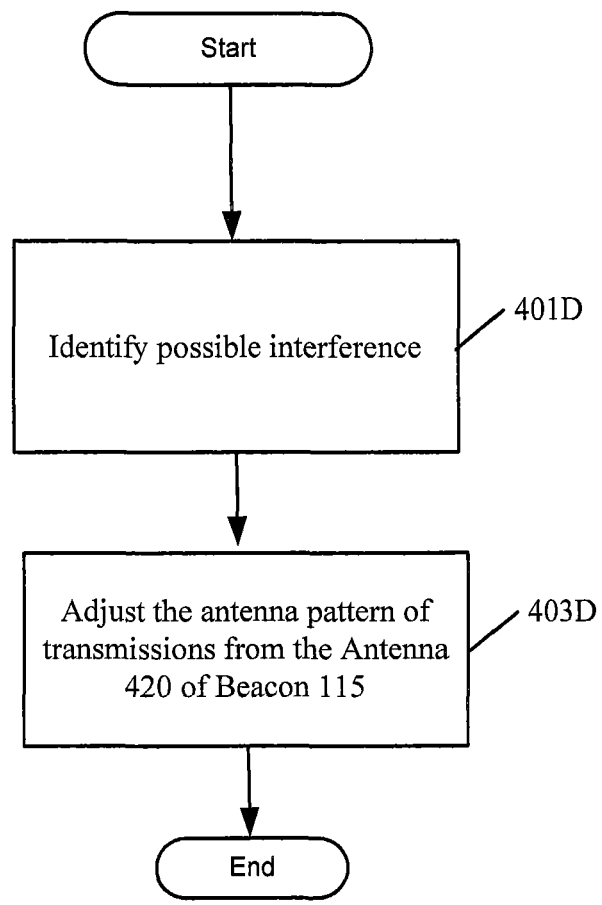
FIG. 4D is a flowchart illustrating transmissions from the antenna that is illustrated in FIG. 4C, according to various embodiments described herein.

Referring now to FIG. 4D, a flowchart is provided illustrating that the beacons 111-115 in the TBN may use smart antennas to transmit signals to the positioning receiver 101. For example, in response to identifying possible interference (Block 401D) with its own transmissions or with transmissions from another beacon, the beacon 115 may adjust the antenna pattern (Block 403D) of its transmissions from the antenna 420. Accordingly, in one example, at least one of the smart antennas may change its antenna pattern in response to detecting interference between its antenna pattern and an antenna pattern of another one of the beacons 111-115. In another example, at least one of the smart antennas may change its antenna pattern in response to detecting reflection (or diffraction) of signals transmitted by the smart antenna(s). The reflected signals may be detected by the beacon(s) transmitting the signal(s) that are reflected and/or by other beacons and/or by the positioning receiver 101 and/or by the monitoring stations 104. Accordingly, the systems and/or methods described herein may reduce/mitigate near-far problems and/or multipath problems resulting from signals transmitted by the beacons 111-115 in the TBN to the positioning receiver 101. As such, the positioning receiver 101 may quickly and accurately determine its position using signals that are transmitted from at least one of the smart antennas of at least one of the beacons 111-115 and are received by the positioning receiver 101.

Figure 5A:
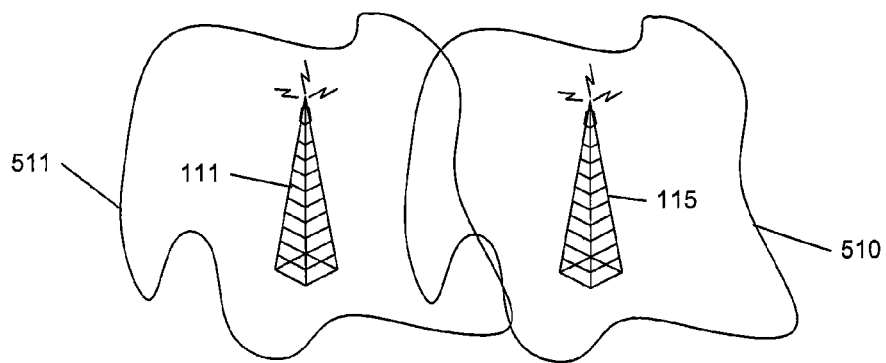
FIGS. 5A, 5C, and 5D are schematic diagrams illustrating antenna patterns of a beacon in a TBN, according to various embodiments described herein.

Referring now to FIG. 5A, antenna patterns 510, 511 are illustrated for the respective beacons 115, 111 in the TBN, according to various embodiments described herein. In particular, FIG. 5A illustrates that the antenna patterns 510, 511 may overlap, which may cause interference.

Figure 5B:
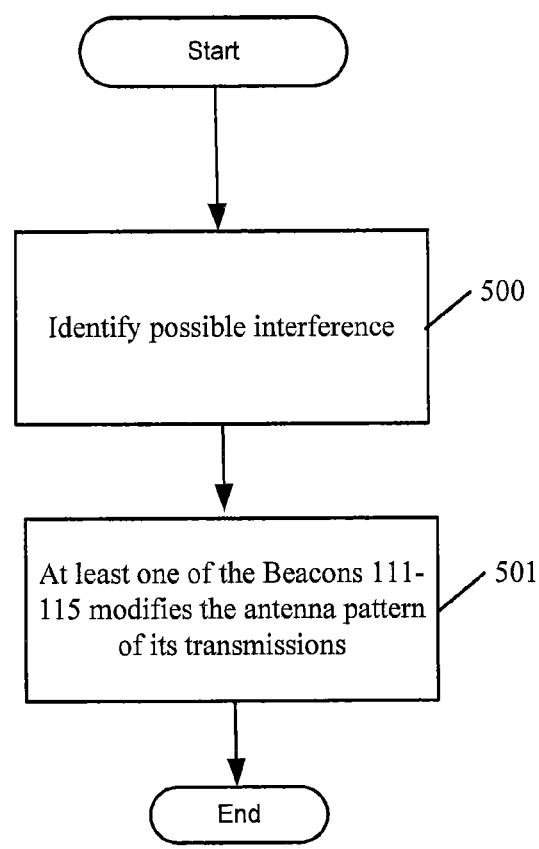
FIGS. 5B and 5E are flowcharts illustrating antenna patterns of a beacon in a TBN, according to various embodiments described herein.

Referring now to FIG. 5B, a flowchart illustrates that in response to identifying possible interference (Block 500) with transmissions from one or more of the beacons 111-115, at least one of the beacons 111-115 modifies the antenna pattern of its transmissions (Block 501). For example, in response to identifying possible interference between antenna patterns of the beacons 111, 115, at least one of the beacons 111, 115 may modify its respective antenna pattern.

Figure 5C:
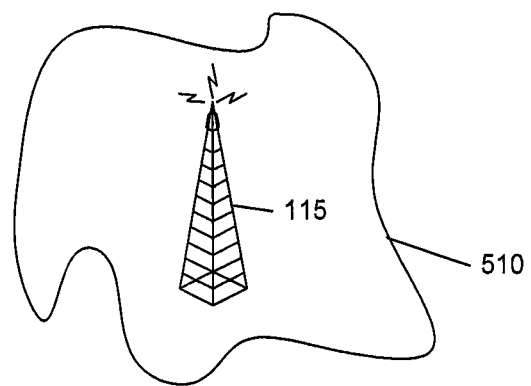
Figure 5D:
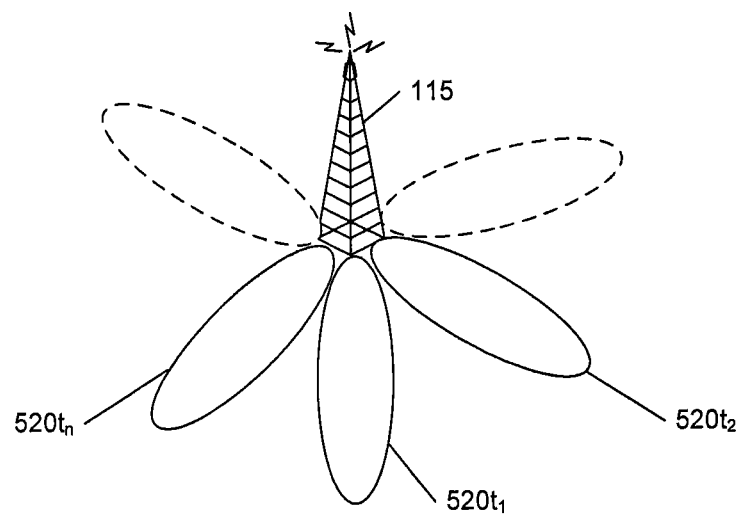

Referring now to FIGS. 5C and 5D, a comparison is illustrated between a standard transmit antenna pattern 510 (FIG. 5C), which is fixed over time, and the antenna pattern 520 (FIG. 5D) of a smart antenna, which may change over time. For example, FIGS. 5C and 5D illustrate a comparison of the horizontal antenna gain/pattern 510 of a standard antenna with the horizontal antenna gain/pattern 520 of a smart antenna. Although FIG. 5D illustrates the horizontal gain/pattern 520 of a smart antenna, the vertical and/or the horizontal antenna pattern can change over time.

Referring to FIG. 5D, the antenna pattern 520 of a smart antenna can vary over time. As such, in embodiments where the beacons 111-115 include smart antennas, an area covered by a transmission from one of the beacons 111-115 for locating a position of the positioning receiver 101 may vary over time. Moreover, one or more of the beacons 111-115 may be Wide Area Positioning System (WAPS) beacons. Antenna patterns 520 for different ones of the beacons 111-115 can change in a coordinated fashion or can assume a random pattern. For example, the antenna pattern 520 may sweep clockwise or counterclockwise through a given area. Alternatively, the antenna pattern 520 may change and cover different portions of the given area in a more random fashion. For a given beacon among the beacons 111-115, the antenna pattern 520 may sweep through an entire 360° of an area over a finite period of a time. For example, over a duration of time $t_n$, the antenna pattern 520 of the beacon 115 may change from antenna pattern $520t_1$ at time $t_1$ to antenna pattern $520t_2$ at time $t_2$ . . . to antenna pattern $520t_n$ at time $t_n$. Additionally, each of the beacons 111-115 need not be the same. For example, some of the beacons 111-115 may have antenna patterns 520 that change in a coordinated fashion and other beacons 111-115 may not. Furthermore, the antenna pattern 520 may be correlated with the location of the positioning receiver 101 or may be independent of the location of the positioning receiver 101.

Use of Smart Antennas to Reduce/Mitigate Near-Far Problem

Referring again to FIG. 1A, the near-far problem may occur when the positioning receiver 101 is near one of the beacons, such as the beacon 115, and far away from at least another one of the beacons, such as the beacons 111-114. However, an antenna pattern of a smart antenna can be changed after using the antenna pattern in a given location for a given duration.

Figure 5E:
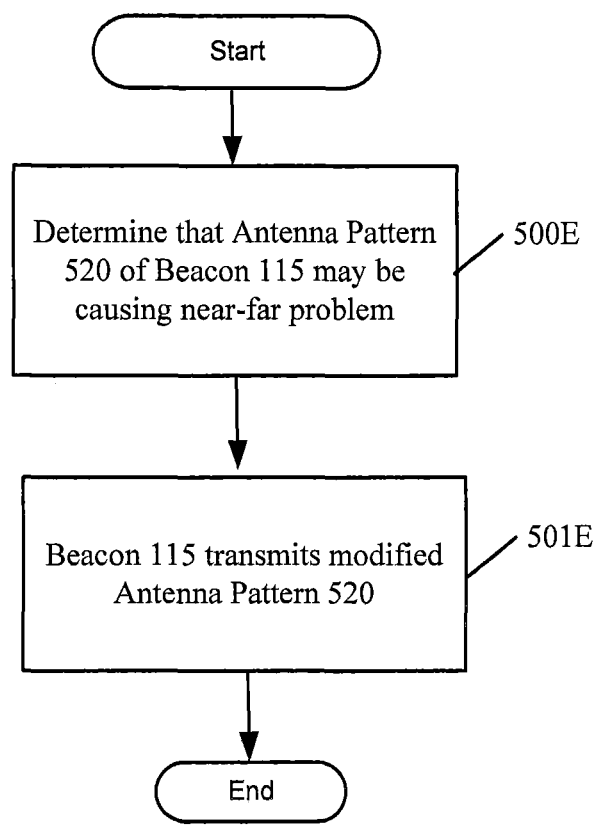

For example, referring now to FIG. 5E, in response to determining that the antenna pattern 520 of the beacon 115 may be causing the near-far problem (Block 500E) (i.e., the beacon may be transmitting overpowering signals), the beacon 115 may modify the pattern (Block 501E) of the antenna pattern 520. For the example, the pattern may be changed such that the antenna pattern 520 no longer covers the area including the positioning receiver 101 (or no longer covers the area as directly/intensely). As such, the near-far problem may be reduced/mitigated, and the positioning receiver 101 may receive signals from farther-away ones of the beacons 111-114.

Smart antennas may change their antenna patterns very rapidly. Accordingly, the location of the positioning receiver 101 may not substantially change during the time for a smart antenna to complete its cycle of coverage, regardless of whether the cycle of coverage is coordinated/fixed or random. For example, a smart antenna of one of the beacons 111-115 may sweep 360° through a coverage area before the positioning receiver 101 has moved beyond a given area. Additionally, in a system of the beacons 111-115, antenna patterns of a plurality of smart antennas distributed over a given geographic area can be coordinated in such a manner as to reduce/minimize instances in which multiple ones of the beacons 111-115 are transmitting toward each other at the same time. Furthermore, in some embodiments, smart antennas may always be used. Alternatively, in other embodiments, smart antennas may be used in response to detecting a near-far problem.

Use of Smart Antennas to Reduce/Mitigate Multipath Problem

Figure 6A:
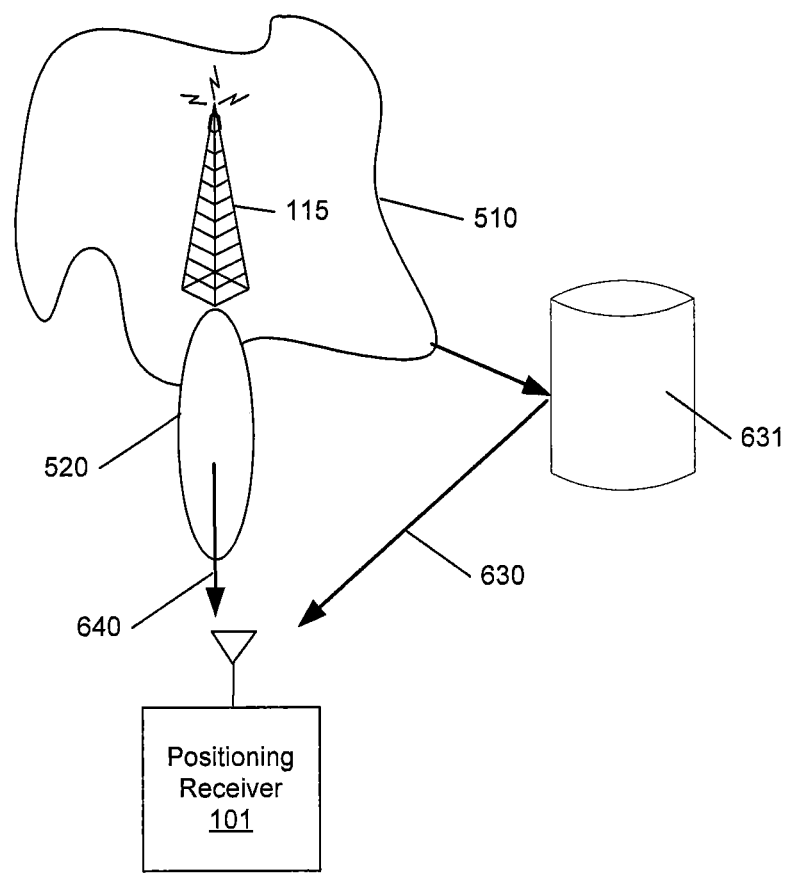
FIG. 6A is a schematic diagram illustrating a direct path signal and a reflected path signal from a beacon in a TBN, according to various embodiments described herein.

Referring now to FIG. 6A, a direct path signal 640 and a reflected path signal 630 from a beacon (e.g., the beacon 115) in the TBN are illustrated, according to various embodiments described herein. For example, using a standard antenna to transmit signals from the beacon 115, the positioning receiver 101 may receive the direct path signal 640 as well as the reflected path signal 630, which may be reflected by a natural or man-made reflector object 631. However, using a smart antenna with a smart antenna pattern 520, the signal strength of the reflected path signal 630 may be either eliminated or significantly reduced because the smart antenna of the beacon 115 can be controlled to not transmit its antenna pattern 520 in the direction of the reflector object 631.

Figure 6B:
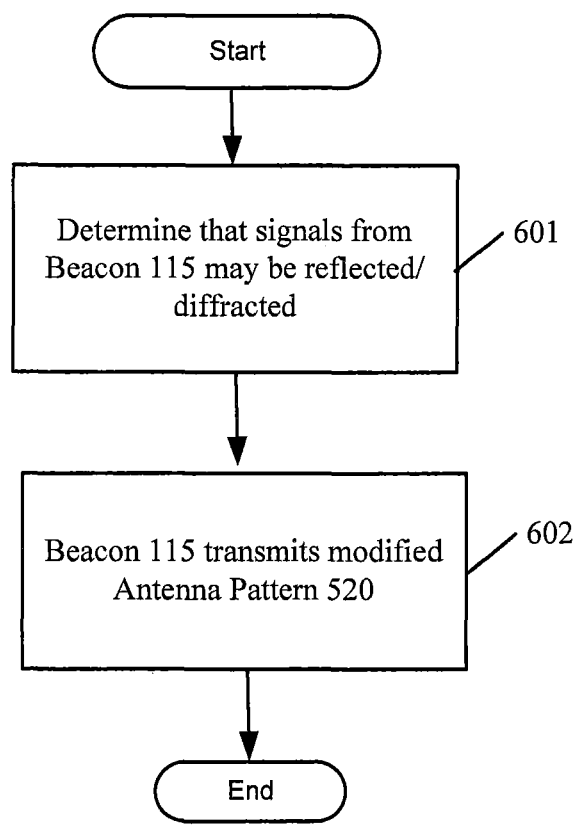
FIGS. 6B and 6C are flowcharts illustrating reflected/diffracted signals, according to various embodiments described herein.

For example, referring now to FIG. 6B, in response to determining that signals from the beacon 115 may be reflected/diffracted (Block 601), the beacon 115 may modify the antenna pattern 520 (Block 602) that it transmits. As an example, a smart antenna of the beacon 115 may produce the antenna pattern 520 for a given duration of time, such as the duration of time $t_1$. Accordingly, multipath problems may be reduced/mitigated by using transmit beacons that include smart antennas. Additionally, in some embodiments, smart antennas may always be used. Alternatively, in other embodiments, smart antennas may be used in response to detecting a multipath problem.

Use of Smart Antennas with Power Control to Reduce/Mitigate Multipath Problem

In some embodiments, multipath problems may be further reduced/minimized by varying/controlling the transmit power of the beacons 111-115 for certain time durations. Alternatively, or outside of those particular time durations, the beacons 111-115 may transmit at full power on a continuous basis. For example, smart antenna systems can be implemented with multiple antennas whereby the transmitter power is switched, and/or by an antenna array where power is supplied to an array on a continuous basis. Accordingly, smart antennas can be used with or without power control techniques.

Figure 6C:
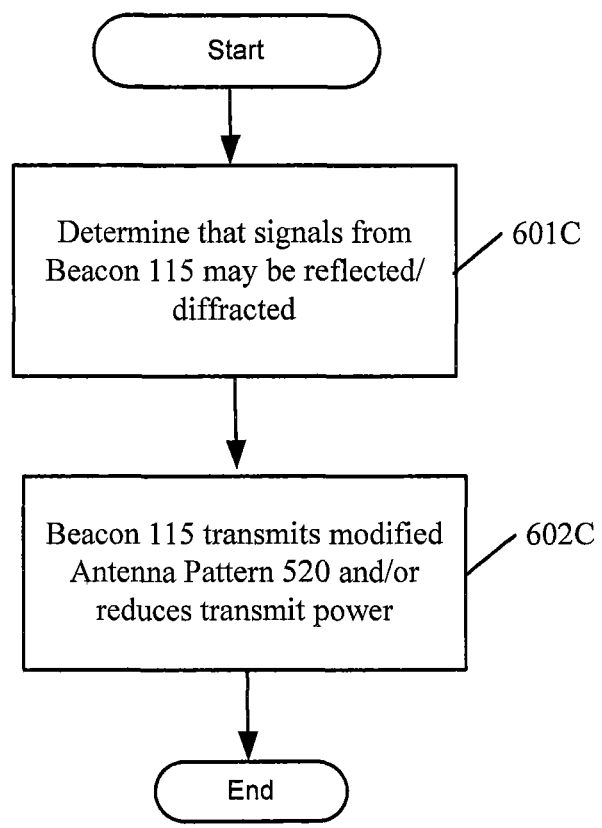

For example, referring now to FIG. 6C, in response to determining that signals from the beacon 115 may be reflected/diffracted (Block 601C), the beacon 115 may modify the antenna pattern 520 and/or reduce its transmit power (Block 602C). Power control techniques may be used randomly or may be used in response to detecting a multipath problem, a near-far problem, or another interference-related problem. Additionally, smart antennas can be used with or without Time Division Multiplexing (TDM) techniques.

Smart antennas may be used to address both the near-far problem and multipath problems or may be used to address either the near-far problem or multipath problems individually. Additionally, power control techniques may be used with any of these combinations of addressing the near-far problem and/or multipath problems.

Multiple Bandwidths

According to some embodiments, systems and/or methods described herein may transmit signals from terrestrial beacons using multiple bandwidths to improve the location accuracy for detecting a position of a receiver. For example, a beacon causing a near-far problem may transmit narrow bandwidth signals, or wide bandwidth signals, or both, while other beacons transmit only one of the narrow bandwidth signals and the wide bandwidth signals. The beacons using multiple signal bandwidths may reduce/mitigate the near-far problem and may thereby improve position location accuracy.

As an example, referring again to FIG. 1A, different signal bandwidths may be transmitted from different ones of the terrestrial beacons 111-115. For example, if the beacon 115 is causing a near-far problem (or a multipath problem), then the beacon 115 may transmit signals having different bandwidths from signals transmitted by one or more of the beacons 111-114. All of the beacons 111-115 may transmit at full power. For example, the beacons 111-114 may transmit wide bandwidth $W_W$ signals at full power and the beacon 115 may transmit a narrow bandwidth $W_N$ signal at full power. Alternatively, the beacons 111-114 may transmit the narrow bandwidth $W_N$ signals at full power and the beacon 115 may transmit the wide bandwidth $W_W$ signal at full power. Such transmissions of multiple bandwidths may reduce/mitigate the near-far problem. For example, using multiple bandwidths may improve filtering/rejection of the signals causing the near-far problem. Additionally, the use of signals with wider bandwidths may improve system gain and may thereby help to detect weaker signals.

Figure 7A:
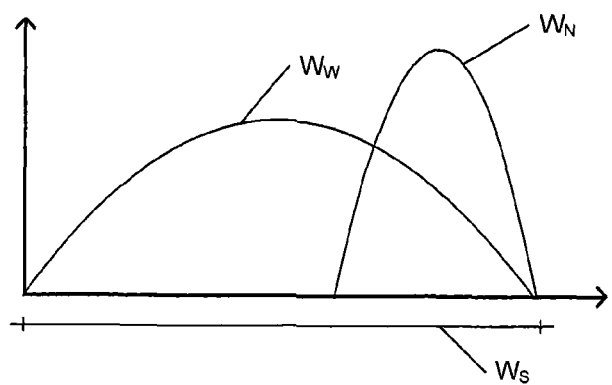
FIGS. 7A-7C illustrate graphs of bandwidths of signals transmitted from a beacon in a TBN, according to various embodiments described herein.
Figure 7B:
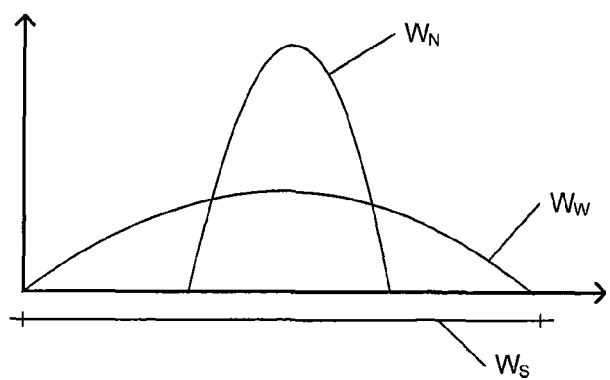
Figure 7C:
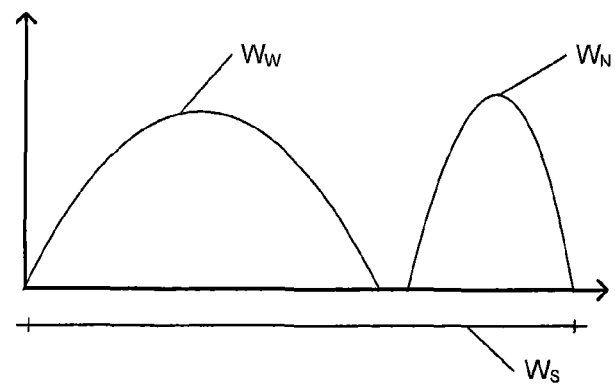
Figure 7D:
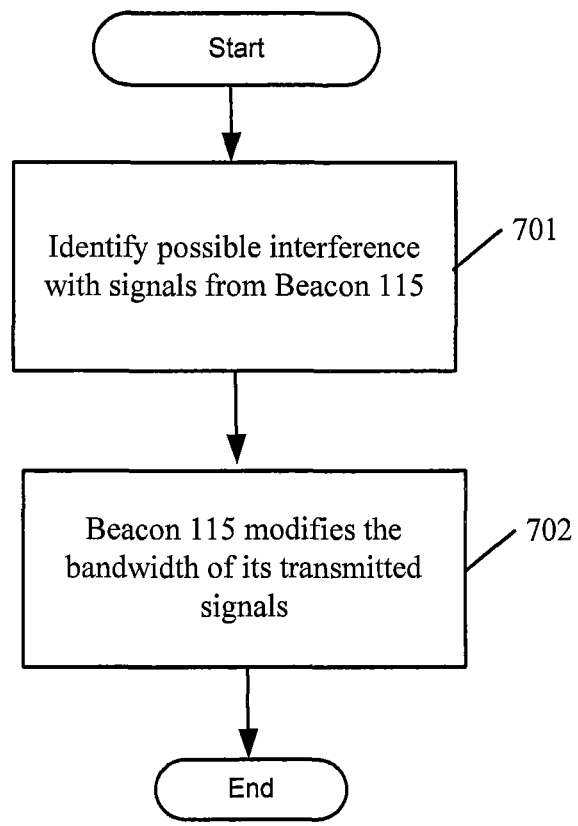
FIGS. 7D-7H are flowcharts illustrating modifying a bandwidth of signals transmitted from a beacon in a TBN, according to various embodiments described herein.

Referring now to FIGS. 7A-7C, graphs of signals from a beacon in the TBN are illustrated, according to various embodiments described herein. In particular, referring to FIGS. 1 and 7A-7C, each of the beacons 111-115 may be configured to transmit the narrow bandwidth $W_N$ signals, the wide bandwidth $W_W$ signals, or both the narrow bandwidth $W_N$ signals and the wide bandwidth $W_W$ signals.

Referring now to FIGS. 7D-7H, flowcharts are provided illustrating modifying a bandwidth of signals transmitted from a beacon in a TBN, according to various embodiments described herein. For example, referring now to FIG. 7D, in response to identifying possible interference with signals from the beacon 115 (Block 701), the beacon 115 may modify the bandwidth of its transmitted signals (Block 702).

Accordingly, in some embodiments, the beacons 111-115 may be configured to switch from one bandwidth to another in response to detecting a near-far problem (or a multipath problem). As an example, the positioning beacon 101, the monitoring station(s) 104, and/or one or more of the beacons 111-115 may detect a multipath problem by detecting actual or potential reflection/diffraction of signals transmitted from one of the beacons 111-115 to the positioning receiver 101. In another example, the positioning beacon 101, the monitoring station(s) 104, and/or one or more of the beacons 111-115 may detect a near-far problem by detecting actual or potential interference between signals from at least two different ones of the beacons 111-115 at the positioning receiver 101. For example, if all of the beacons 111-115 are transmitting the narrow bandwidth $W_N$ signals, the beacon 115 causing the near-far problem may be configured to switch to transmitting the wide bandwidth $W_W$ signals in response to detecting the near-far problem. Additionally, the wide bandwidth $W_W$ signals may help to improve position location accuracy and/or to reduce/mitigate a multipath problem. Moreover, the positioning receiver 101 may be configured to receive and/or process both the narrow bandwidth $W_N$ signals and the wide bandwidth $W_W$ signals.

The beacons 111-115 may also transmit signals at other bandwidths than the wide bandwidth $W_W$ signals or the narrow bandwidth $W_N$ signals that are illustrated in FIGS. 7A-7C. For example, each of the beacons 111-115 may be configured to transmit signals having a variety of bandwidths within a shared frequency band $W_S$. These signals with different bandwidths may be tailored for each beacon depending on the need for reduction/mitigation of the near-far problem and the need for position location accuracy. Additionally, in some embodiments, the transmitted signals may be located anywhere within the shared frequency band $W_S$. Accordingly, the frequency ranges and bandwidths of the transmitted signals are not limited to those that are illustrated in FIGS. 7A-7C, but rather may vary within the shared frequency band $W_S$.

The narrow bandwidth $W_N$ signals and the wide bandwidth $W_W$ signals may both be within the shared frequency band $W_S$. Additionally, the narrow bandwidth $W_N$ signals have smaller bandwidths than the wide bandwidth $W_W$ signals and, in some embodiments, may be several times smaller than the wide bandwidth $W_W$ signals. For example, the shared frequency band $W_S$ may be about eight (8) Megahertz (MHz), and the narrow and wide bandwidths $W_N$ and $W_W$ may be non-overlapping and may be about two (2) MHz and six (6) MHZ, respectively. In another example, although the shared frequency band $W_S$ may still be about 8 MHz, the narrow and wide bandwidths $W_N$ and $W_W$ may overlap (e.g., may be about 2 MHz and 8 MHz, respectively). Other combinations of frequency allocations (and/or other bands) will be understood by those skilled in the art.

A. Overlapping Frequency Bands

Referring again to FIG. 7A, the frequency band of the narrow bandwidth $W_N$ signals may be within the frequency band of the wide bandwidth $W_W$ signals. In other words, the frequency bands may overlap. For example, as illustrated in FIG. 7A, the frequency band of the wide bandwidth $W_W$ signals may be approximately the same as the shared frequency band $W_S$, and the frequency band of the narrow bandwidth $W_N$ signals may be centered around an upper or lower end of the shared frequency band $W_S$.

Referring again to FIG. 7B, the frequency band of the wide bandwidth $W_W$ signals may be approximately the same as the shared frequency band $W_S$, and the frequency band of the narrow bandwidth $W_N$ signals may be centered around the center of the shared frequency band $W_S$. Alternatively, the frequency band of the narrow bandwidth $W_N$ signals may be off-center with respect to the shared frequency band $W_S$, but portions of the upper and lower ends of the shared frequency band $W_S$ may still be non-overlapping with the frequency band of the narrow bandwidth $W_N$ signals.

In embodiments where the wide bandwidth $W_W$ signals overlap the narrow bandwidth $W_N$ signals in the shared frequency band $W_S$, reduction/mitigation of the near-far problem may be improved by transmitting the narrow bandwidth $W_N$ signals from the beacon 115 causing the near-far problem and transmitting wide bandwidth $W_W$ signals from the beacons 111-114, or vice versa. For example, if the transmit power for the narrow bandwidth $W_N$ signals is the same as the transmit power for the wide bandwidth $W_W$ signals, then the narrow bandwidth $W_N$ signals may have a higher power spectrum density. As such, the positioning receiver 101 may detect this higher power spectrum density and use it to distinguish the narrow bandwidth $W_N$ signals from the wide bandwidth $W_W$ signals. The positioning receiver 101 may then filter/reject the signals causing the near-far problem.

B. Non-Overlapping Frequency Bands

Referring again to FIG. 7C, the frequency bands of the narrow bandwidth $W_N$ signals and the wide bandwidth $W_W$ signals may be non-overlapping. Although FIG. 7C illustrates the frequency bands of the narrow bandwidth $W_N$ signals and the wide bandwidth $W_W$ signals as being entirely non-overlapping, the frequency band of the wide bandwidth $W_W$ signals may alternatively overlap a portion (but not all) of the frequency band of the narrow bandwidth $W_N$ signals. If the frequency bands of the narrow bandwidth $W_N$ signals and the wide bandwidth $W_W$ signals are entirely non-overlapping, then the frequency bands may be on opposing ends of the shared frequency band $W_S$. For example, the frequency band of the narrow bandwidth $W_N$ signals may be on the upper end of the shared frequency band $W_S$, and the frequency band of the wide bandwidth $W_W$ signals may be on the lower end of the shared frequency band $W_S$, or vice versa. Regardless of the specific portions of the shared frequency band $W_S$ used by the beacons 111-115, transmitting at non-overlapping portions of the shared frequency band $W_S$ may simplify the detection and/or filtering/rejection of signals causing the near-far problem.

CDMA Processing

In some embodiments, CDMA processing gain techniques may reduce/mitigate near-far problems caused by the beacon 115. For example, if the beacon 115 transmits the narrow bandwidth $W_N$ signal and the beacons 111-114 transmit the wide bandwidth $W_W$ signals, the narrow bandwidth $W_N$ signals may appear as jammer/interference sources of the wide bandwidth $W_W$ signals. The positioning receiver 101 may be configured to detect and/or filter/reject such jammer/interference sources. For example, the narrow bandwidth $W_N$ signals transmitted by the beacon 115 may be filtered/rejected using CDMA processing gain.

Alternatively, in some embodiments, the beacon 115 causing near-far problems may transmit the wide bandwidth $W_W$ signals, and other ones of the beacons 111-114 may transmit the narrow bandwidth $W_N$ signals. In such embodiments, the positioning receiver 101 may be configured to detect and/or filter/reject the wide bandwidth $W_W$ signals because they have a lower power flux density than the narrow bandwidth $W_N$ signals.

Figure 7E:
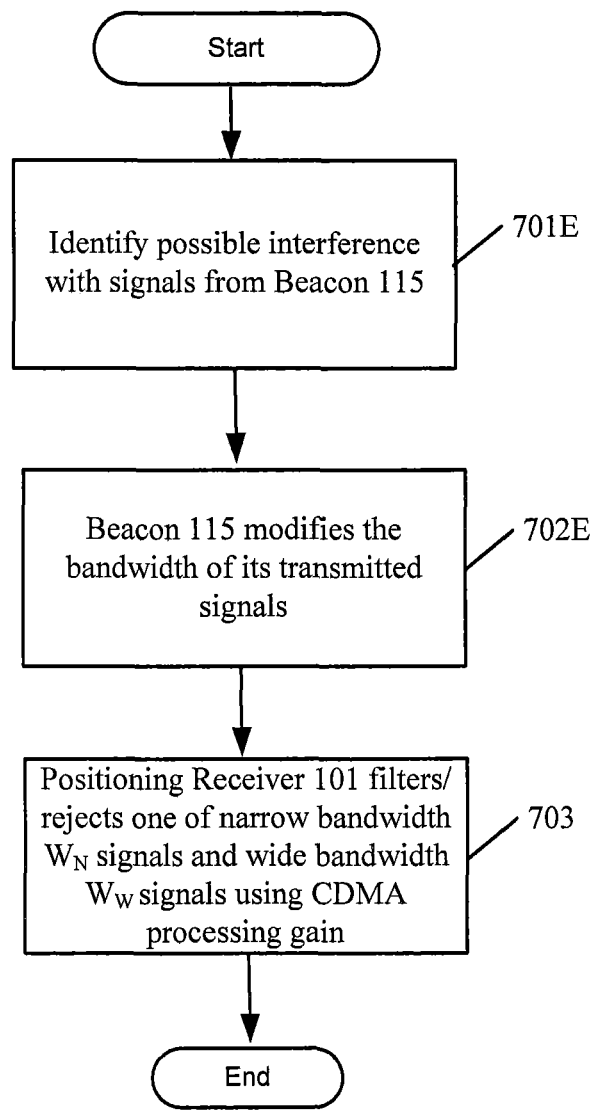
Figure 7F:
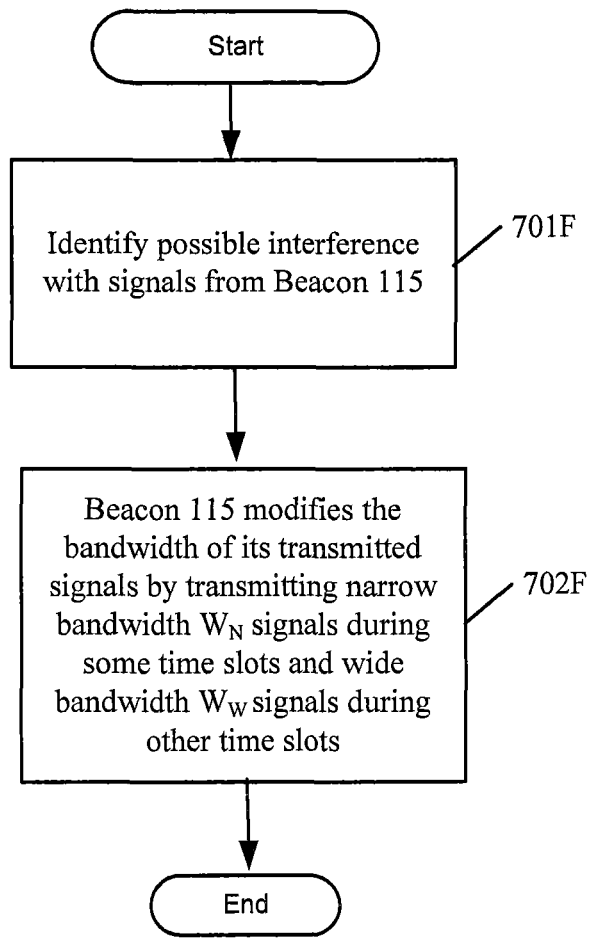

As an example, referring now to FIG. 7E, in response to identifying possible interference with signals from the beacon 115 (Block 701E), the beacon 115 may modify the bandwidth of its transmitted signals (Block 702E) (e.g., from narrow bandwidth $W_N$ to wide bandwidth $W_W$, or vice versa), and the positioning receiver 101 may filter/reject one of the narrow bandwidth $W_N$ signals and the wide bandwidth $W_W$ signals using CDMA processing gain (Block 703).

Transmitting Both Narrow and Wide Bandwidth Signals from a Single Beacon

As an alternative to transmitting only one of the wide bandwidth $W_W$ signals and the narrow bandwidth $W_N$ signals at all times, one or more of the beacons 111-115 may be configured to individually transmit signals having different bandwidths at different times. For example, referring now to FIG. 7F, in response to identifying possible interference with signals from the beacon 115 (Block 701F), the beacon 115 causing near-far problems may transmit a combination of the wide bandwidth $W_W$ signals and the narrow bandwidth $W_N$ signals at full power, while the beacons 111-114 may transmit using only one of the wide bandwidth $W_W$ signals and the narrow bandwidth $W_N$ signals at full power. In particular, the beacon 115 may transmit the wide bandwidth $W_W$ signals during some time slots and the narrow bandwidth $W_N$ signals during other time slots (Block 702F).

Use of Power Control with Wide or Narrow Bandwidth Signals

In some embodiments, power control techniques may be used for one or more of the beacons 111-115. In some embodiments using power control, all of the beacons 111-115 may transmit the same bandwidth signals but at different power levels. For example, the beacon 115 causing the near-far problem may transmit the wide bandwidth $W_W$ signal at a reduced power level (in other words, with power control) and the beacons 111-114 may transmit the wide bandwidth $W_W$ signals at full power (in other words, without power control). Alternatively, power control may be used for the beacon 115 transmitting a narrow bandwidth $W_N$ signal.

Figure 7G:
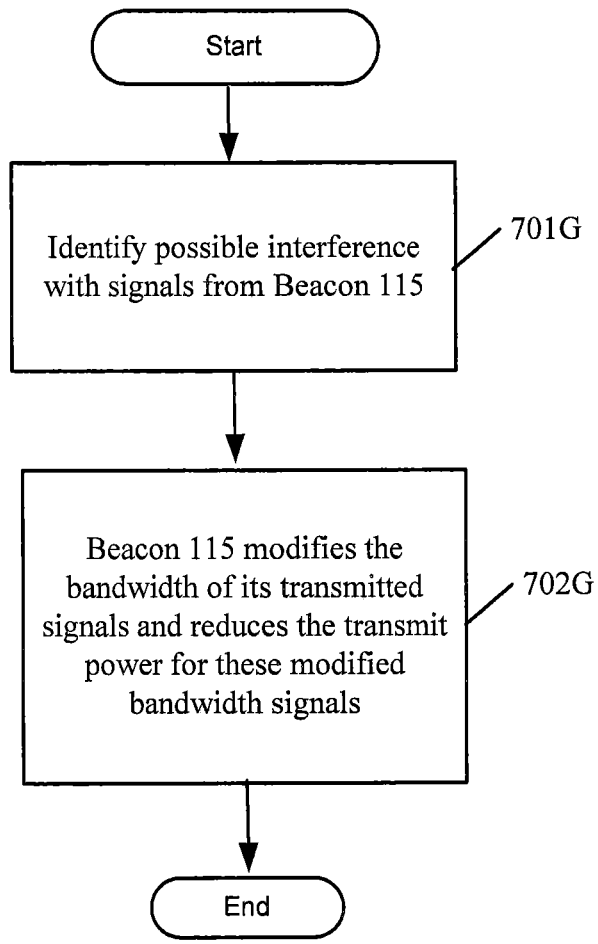
Figure 7H:
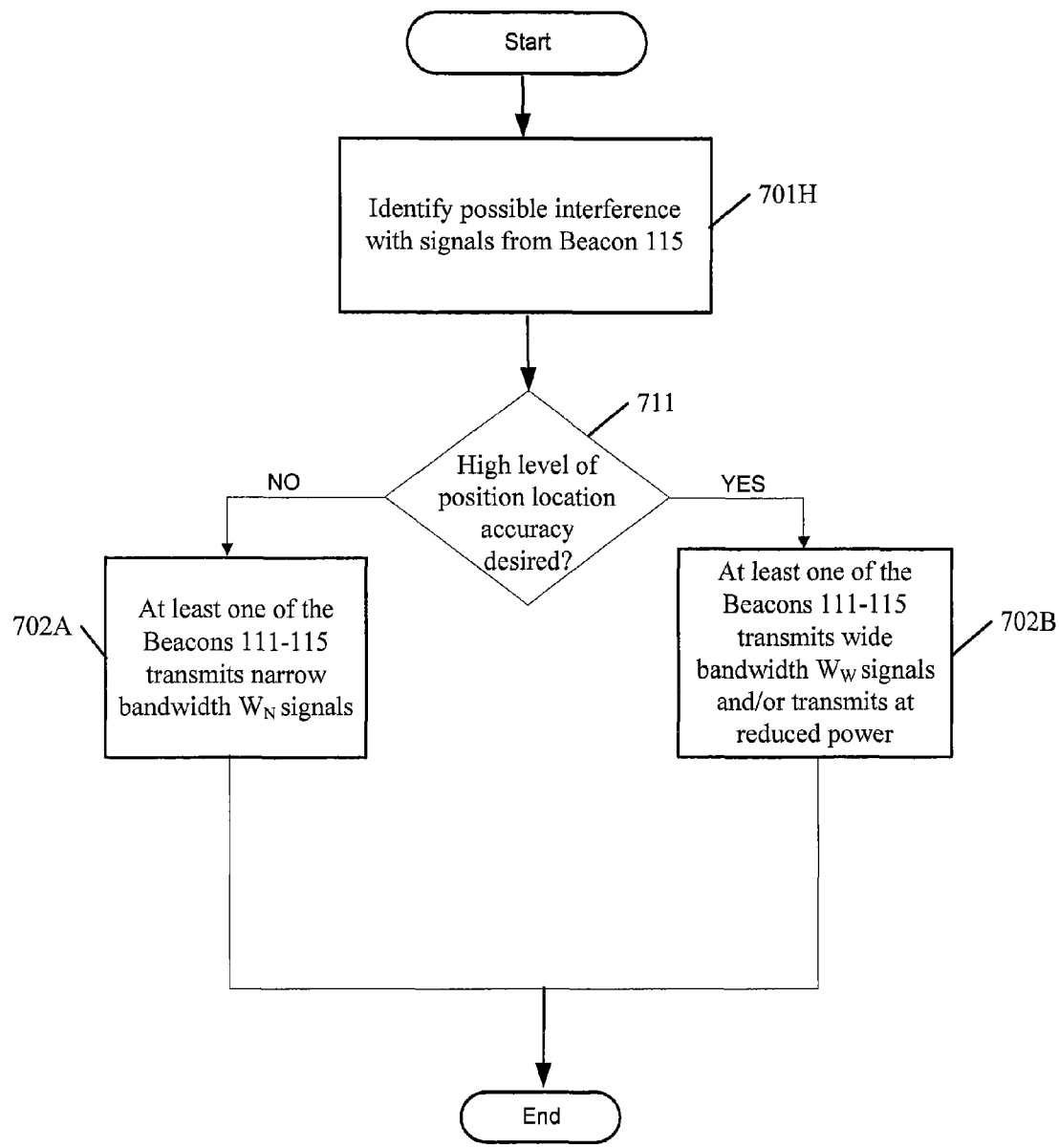

Additionally, power control techniques may be combined with techniques of modifying the bandwidth of signals, For example, referring now to FIG. 7G, in response to identifying possible interference with signals from the beacon 115 (Block 701G), the beacon 115 may modify the bandwidth (e.g., from narrow bandwidth $W_N$ to wide bandwidth $W_W$, or vice versa) of the signals it transmits and may reduce the transmit power for these modified bandwidth signals (Block 702G). Accordingly, using power control and a modified bandwidth for the beacon 115 causing the near-far problem may reduce/mitigate the near-far problem and may thereby improve position location accuracy.

In addition to power control for the beacon 115, power control may be used for one or more of the beacons 111-114. However, in some embodiments, ones of the beacons 111-115 which do not require near-far protection for receivers near their location may not use power control.

Position Location Accuracy

The beacons 111-115 may determine whether to transmit the wide bandwidth $W_W$ or the narrow bandwidth $W_N$ signals based on position location accuracy needs/preferences. For example, referring now to FIG. 7H, in response to determining that a high level of position location accuracy is desired (such as a given threshold level of position location accuracy) (Block 711), one or more of the beacons 111-115 may transmit the wide bandwidth $W_W$ signals instead of the narrow bandwidth $W_N$ signals, and/or may use power control (Block 702B). On the other hand, in response to determining that a lower level of position location accuracy is sufficient (Block 711), one or more of the beacons 111-115 may transmit the narrow bandwidth $W_N$ signals instead of the wide bandwidth $W_W$ signals (Block 702A). The determination of accuracy needs/preferences may be performed by the positioning receiver 101 or may be performed externally to the positioning receiver 101. Additionally, in some embodiments, the determination of whether a high level of position location accuracy is desired (Block 711) is in response to identifying possible interference with signals from the beacon 115 (Block 701H).

Combinations with Multiple Bandwidth Systems

Multiple bandwidth signals (MBS) systems, such as systems that combine transmission of the narrow bandwidth $W_N$ signals with transmission of the wide bandwidth $W_W$ signals as illustrated in FIGS. 7A-7C, may be combined with various techniques to reduce/mitigate near-far problems. For example, MBS systems may be used with or without power control (e.g., as illustrated in FIG. 7G). In another example, MBS systems may be used with or without smart antennas. Additionally, signals in MBS systems may use CDMA codes having improved cross-correlation properties.

Multiple Beacons Transmitting in a Time Slot

Figure 8A:
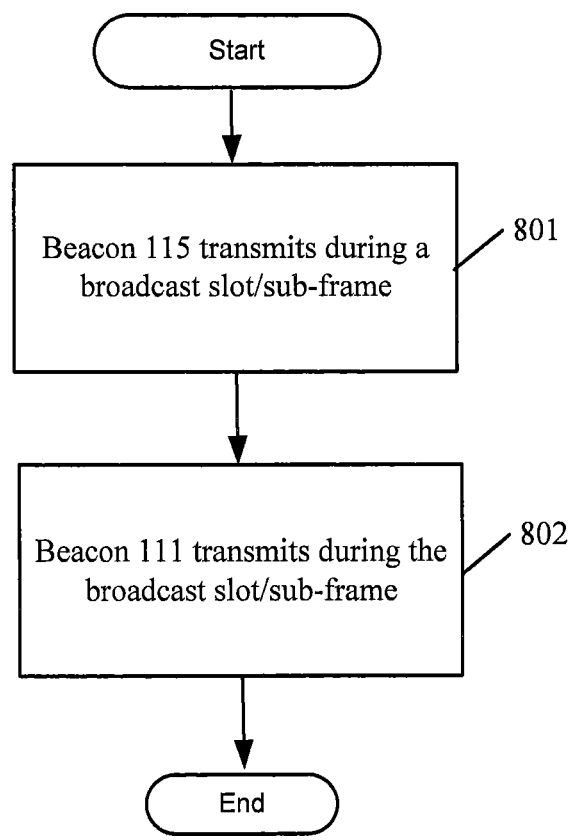
FIG. 8A is a flowchart illustrating transmissions from first and second beacons in a TBN during a frame, according to various embodiments described herein.

Referring now to FIG. 8A, a flowchart is provided illustrating transmissions from first and second beacons in a TBN during a frame, according to various embodiments described herein. For example, Block 801 illustrates that the beacon 115 may transmit during a broadcast slot/sub-frame, and Block 802 illustrates that the beacon 111 may transmit during the same broadcast slot/sub-frame.

Figure 8B:
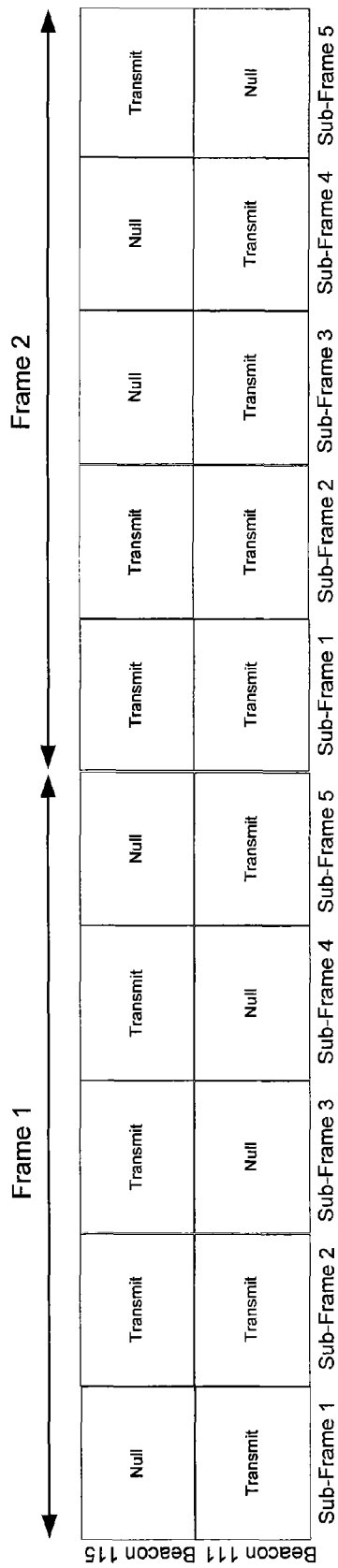
FIG. 8B is a diagram illustrating transmit states of first and second beacons in a TBN during consecutive frames, according to various embodiments described herein.

Referring now to FIG. 8B, a diagram is provided illustrating transmit states of first and second beacons (e.g., the beacons 111 and 115) in the TBN for consecutive frames, according to various embodiments described herein. For example, FIG. 8B illustrates that the beacons 111 and 115 are configured to simultaneously transmit respective signals to the positioning receiver 101 during each broadcast frame (e.g., during each of "Frame 1" and "Frame 2"). In particular, during at least one of the slots/sub-frames for each of Frame 1 and Frame 2, the beacons 111 and 115 will both be transmitting. For example, the beacons 111 and 115 both transmit during sub-frame 2 of Frame 1. Additionally, the beacons 111 and 115 both transmit during sub-frames 1 and 2 of Frame 2.

Moreover, FIG. 8B illustrates that Frames 1 and 2 are contiguous/consecutive broadcast frames, and that the beacons 111 and 115 simultaneously transmit their respective signals during the contiguous/consecutive Frames 1 and 2. Additionally, it will be understood by those skilled in the art that although Frames 1 and 2 are provided as one example, the beacons 111 and 115 (and/or other ones of the beacons 111-115) may simultaneously transmit their respective signals during a much longer string of contiguous/consecutive broadcast frames (e.g., at least hundreds or thousands of contiguous/consecutive broadcast frames). In some embodiments, all of the beacons 111-115 may simultaneously transmit their respective signals to the positioning receiver 101 during at least one sub-frame of at least one of the Frames 1 and 2.

Furthermore, the simultaneous transmissions illustrated in sub-frame 2 of Frame 1 and in sub-frames 1 and 2 of Frame 2 are transmissions at one or more non-trivial power levels. In other words, the simultaneous transmissions are at one or more power levels at which the positioning receiver 101 is configured to receive and process each of the respective signals. Accordingly, at least two of the beacons 111-115 will simultaneously transmit at one or more non-trivial power levels during at least one broadcast slot/sub-frame in every frame. During the at least one broadcast slot-sub-frame, other ones of the beacons 111-115 may be transmitting at non-trivial power levels, at trivial power levels (e.g., levels below which the positioning receiver 101 can receive and process the signals), or may not even be transmitting at all. Additionally, in some embodiments, at least two of the beacons 111-115 may simultaneously transmit at one or more non-trivial power levels during each broadcast slot/sub-frame in every frame.

In some embodiments, the positioning receiver 101 may distinguish between simultaneous signals from different ones of the beacons 111-115 by processing different pseudo-random codes that are transmitted with the different signals. For example, different pseudo-random codes may provide different levels of isolation (e.g., thirty (30) dB isolation, etc.). In some embodiments, the pseudo-random codes may provide a frequency offset (e.g., a frequency shift of about two (2) kilohertz (kHz)). Accordingly, some embodiments may provide Code Division Multiplexing (CDM) within the Time Division Multiplexing (TDM) slots/sub-frames illustrated in FIG. 8B.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed exemplary embodiments of the invention. Although specific terms are employed, they are used in a generic and descriptive sense only and not for purposes of limitation, the scope of the invention being defined by the following claims.

What is claimed:

1. A method of reducing interference in a terrestrial-based positioning beacon network, comprising:
    determining that transmissions from a first pseudolite in the terrestrial-based positioning beacon network are sufficiently powerful enough to interfere with simultaneous transmissions from a second pseudolite in the terrestrial-based positioning beacon network at a terrestrial receiver;
    modifying the transmissions from the first pseudolite to the terrestrial receiver in response to determining that the transmissions from the first pseudolite are sufficiently powerful enough to interfere with the simultaneous transmissions from the second pseudolite at the terrestrial receiver; and
    transmitting unmodified transmissions from the first pseudolite to the terrestrial receiver in response to failure to identify interference potentially caused by the first pseudolite,
    wherein the first pseudolite is closest to the terrestrial receiver and the second pseudolite is farther than the first pseudolite from the terrestrial receiver, and
    wherein modifying comprises modifying the transmissions from the first pseudolite that is closest to the terrestrial receiver.

2. The method of claim 1, wherein modifying the transmissions from the first pseudolite comprises modifying at least one of transmit power, antenna pattern, and bandwidth for signals transmitted from the first pseudolite to the terrestrial receiver, in response to a change in signal characteristics of the terrestrial-based positioning beacon network.

3. The method of claim 2, further comprising:
    after modifying the transmissions from the first pseudolite by modifying at least one of the transmit power, the antenna pattern, and the bandwidth, further modifying the transmissions from the first pseudolite by modifying a different one of the transmit power, the antenna pattern, and the bandwidth.

4. The method of claim 2, wherein modifying the transmissions from the first pseudolite further comprises increasing the bandwidth of the signals transmitted from the first pseudolite in response to determining that a high level of position location accuracy is preferred.

5. A method of reducing interference in a terrestrial-based positioning beacon network, comprising:
    receiving simultaneous unmodified transmissions from first and second terrestrial-based positioning beacons at one or more non-trivial power levels at a terrestrial receiver, wherein the unmodified transmissions from the first terrestrial-based positioning beacon are identified, during field testing of the terrestrial-based positioning beacon network and/or in real-time, as stronger at the terrestrial receiver than the unmodified transmissions from the second terrestrial-based positioning beacon at the terrestrial receiver; and
    after receiving the simultaneous unmodified transmissions, receiving and processing modified transmissions, from the first terrestrial-based positioning beacon, at the one or more non-trivial power levels at the terrestrial receiver, in response to identifying, during the field testing and/or in real-time, that the unmodified transmissions from the first terrestrial-based positioning beacon are stronger at the terrestrial receiver than the unmodified transmissions from the second terrestrial-based positioning beacon at the terrestrial receiver, while simultaneously receiving the unmodified transmissions from the second terrestrial-based positioning beacon at the terrestrial receiver,
    wherein the first terrestrial-based positioning beacon comprises a first pseudolite that is closest to the terrestrial receiver and the second terrestrial-based positioning beacon comprises a second pseudolite that is farther than the first pseudolite from the terrestrial receiver, and
    wherein receiving and processing comprises receiving and processing the modified transmissions from the first pseudolite that is closest to the terrestrial receiver, while simultaneously receiving the unmodified transmissions from the second pseudolite that is farther from the terrestrial receiver.

6. The method of claim 5, wherein the modified transmissions are modified in comparison with the unmodified transmissions with respect to at least one of transmit power, antenna pattern, and bandwidth.

* * * * *

UNITED STATES PATENT AND TRADEMARK OFFICE
CERTIFICATE OF CORRECTION

PATENT NO. : 9,933,525 B2  
APPLICATION NO. : 13/334997  
DATED : April 3, 2018  
INVENTOR(S) : Rajendra Singh Page 1 of 1

It is certified that error appears in the above-identified patent and that said Letters Patent is hereby corrected as shown below:

In the Specification

Column 11, Line 5: Please correct "(Block 205')" to read -- (Block 205") --

Signed and Sealed this
Fourteenth Day of August, 2018

Andrei Iancu
*Director of the United States Patent and Trademark Office*